United States Patent
Wezter et al.

(10) Patent No.: US 8,266,066 B1
(45) Date of Patent: Sep. 11, 2012

(54) MAINTENANCE, REPAIR AND OVERHAUL MANAGEMENT

(75) Inventors: Michael Wezter, Redwood City, CA (US); Gary R. Garrow, Burbank, CA (US); David P. West, II, Newnan, GA (US); Patrick E. Weir, San Francisco, CA (US); Gary Ashby, Kent (GB); Charles P. Newton, III, Rock Hill, SC (US)

(73) Assignee: Accenture Global Services Limited, Dublin (IE)

( * ) Notice: Subject to any disclaimer, the term of this patent is extended or adjusted under 35 U.S.C. 154(b) by 3037 days.

(21) Appl. No.: 09/946,093

(22) Filed: Sep. 4, 2001

(51) Int. Cl.
*G06Q 20/00* (2012.01)
*G06F 9/45* (2006.01)

(52) U.S. Cl. .......................... 705/78; 703/20
(58) Field of Classification Search ............... 705/28, 705/78
See application file for complete search history.

(56) References Cited

U.S. PATENT DOCUMENTS

| | | | |
|---|---|---|---|
| 4,744,026 A | 5/1988 | Vanderbei | |
| 4,888,692 A | 12/1989 | Gupta et al. | |
| 4,908,775 A | 3/1990 | Palusamy et al. | |
| 5,140,537 A | 8/1992 | Tullis | |
| 5,216,612 A | 6/1993 | Cornett et al. | |
| 5,295,065 A | 3/1994 | Chapman et al. | |
| 5,311,562 A | 5/1994 | Palusamy et al. | |
| 5,331,579 A | 7/1994 | Maguire, Jr. et al. | |
| 5,343,388 A | 8/1994 | Wedelin | |
| 5,434,775 A | 7/1995 | Sims et al. | |
| 5,596,507 A | 1/1997 | Jones et al. | |
| 5,630,070 A | 5/1997 | Dietrich et al. | |
| 5,710,723 A | 1/1998 | Hoth et al. | |
| 5,737,728 A | 4/1998 | Sisley et al. | |
| 5,754,451 A | 5/1998 | Williams | |
| 5,778,381 A | 7/1998 | Sandifer | |
| 5,826,236 A | 10/1998 | Narimatsu et al. | |
| 5,877,961 A | 3/1999 | Moore | |
| 5,890,133 A | 3/1999 | Ernst | |
| 5,897,629 A | 4/1999 | Shinagawa et al. | |
| 5,917,726 A | 6/1999 | Pryor | |
| 5,918,219 A | 6/1999 | Isherwood | |
| 5,920,846 A * | 7/1999 | Storch et al. | 705/7.14 |
| 5,931,878 A | 8/1999 | Chapin, Jr. | |
| 5,963,911 A | 10/1999 | Walker et al. | |

(Continued)

FOREIGN PATENT DOCUMENTS

CA 2393395 6/2001

(Continued)

OTHER PUBLICATIONS

McQueen, G., "Aircraft Maintenance," Industrial Maintenance & Plant Operations, Aug. 1996.*

(Continued)

*Primary Examiner* — Garcia Ade

(74) *Attorney, Agent, or Firm* — Brinks Hofer Gilson & Lione

(57) ABSTRACT

A framework for maintenance, repair and overhaul business management includes a first layer identifying business areas in an MRO business, a second layer identifying one or more processes within each business area and a third layer identifying one or more sub-processes within each process wherein the business area include flight operations management, maintenance execution, maintenance management, engineering and maintenance support, material management, product development, enterprise management, strategic management, and demand generation.

12 Claims, 4 Drawing Sheets

U.S. PATENT DOCUMENTS

| | | | |
|---|---|---|---|
| 5,970,437 A | 10/1999 | Gorman et al. | |
| 5,970,466 A | 10/1999 | Detjen et al. | |
| 5,987,474 A | 11/1999 | Sandifer | |
| 5,995,915 A | 11/1999 | Reed et al. | |
| 6,006,171 A | 12/1999 | Vines et al. | |
| 6,014,633 A | 1/2000 | DeBusk et al. | |
| 6,021,437 A | 2/2000 | Chen et al. | |
| 6,029,104 A | 2/2000 | Kim | |
| 6,030,072 A | 2/2000 | Silverbrook | |
| 6,038,539 A | 3/2000 | Maruyama et al. | |
| 6,067,486 A * | 5/2000 | Aragones et al. | 701/29.6 |
| 6,067,488 A * | 5/2000 | Tano | 701/33.4 |
| 6,078,912 A | 6/2000 | Buerger et al. | |
| 6,101,481 A * | 8/2000 | Miller | 705/7.13 |
| 6,110,214 A | 8/2000 | Klimasauskas | |
| 6,128,543 A | 10/2000 | Hitchner | |
| 6,128,656 A | 10/2000 | Matchefts et al. | |
| 6,154,735 A | 11/2000 | Crone | |
| 6,175,934 B1 | 1/2001 | Hershey et al. | |
| 6,192,325 B1 * | 2/2001 | Piety et al. | 702/184 |
| 6,208,955 B1 * | 3/2001 | Provan et al. | 703/20 |
| 6,219,654 B1 | 4/2001 | Ruffin | |
| 6,230,200 B1 | 5/2001 | Forecast et al. | |
| 6,230,480 B1 | 5/2001 | Rollins, III | |
| 6,292,806 B1 | 9/2001 | Sandifer | |
| 6,295,513 B1 | 9/2001 | Thackston | |
| 6,308,162 B1 | 10/2001 | Ouimet et al. | |
| 6,321,207 B1 | 11/2001 | Ye | |
| 6,349,274 B1 * | 2/2002 | Kay et al. | 703/13 |
| 6,418,361 B2 | 7/2002 | Sinex | |
| 6,496,814 B1 | 12/2002 | Busche | |
| 6,571,158 B2 | 5/2003 | Sinex | |
| 6,580,982 B2 | 6/2003 | Sinex | |
| 6,594,621 B1 | 7/2003 | Meeker | |
| 6,594,786 B1 | 7/2003 | Connelly et al. | |
| 6,598,940 B2 | 7/2003 | Sinex | |
| 6,606,546 B2 | 8/2003 | Sinex | |
| 6,618,805 B1 | 9/2003 | Kampe | |
| 6,671,593 B2 | 12/2003 | Sinex | |
| 6,678,716 B1 * | 1/2004 | Pronsati et al. | 709/201 |
| 6,684,136 B2 | 1/2004 | Sinex | |
| 6,684,349 B2 | 1/2004 | Gullo et al. | |
| 6,691,006 B2 | 2/2004 | Sinex | |
| 6,691,064 B2 | 2/2004 | Vroman | |
| 6,691,244 B1 | 2/2004 | Kampe et al. | |
| 6,701,298 B1 * | 3/2004 | Jutsen | 705/7.39 |
| 6,714,829 B1 | 3/2004 | Wong | |
| 6,732,028 B2 | 5/2004 | Vanstory et al. | |
| 6,738,748 B2 | 5/2004 | Wetzer | |
| 6,801,820 B1 | 10/2004 | Lilly et al. | |
| 6,820,038 B1 | 11/2004 | Wetzer et al. | |
| 6,832,205 B1 | 12/2004 | Aragones et al. | |
| 6,980,959 B1 | 12/2005 | Garrow et al. | |
| 7,031,941 B2 | 4/2006 | Garrow et al. | |
| 7,058,587 B1 | 6/2006 | Horne | |
| 7,085,766 B2 | 8/2006 | Keith, Jr. | |
| 7,124,059 B2 | 10/2006 | Wetzer et al. | |
| 7,231,374 B1 | 6/2007 | Balasinski | |
| 7,895,047 B2 | 2/2011 | Wetzer et al. | |
| 7,987,108 B2 | 7/2011 | Wetzer et al. | |
| 2001/0053991 A1 | 12/2001 | Bonabeau | |
| 2002/0007225 A1 | 1/2002 | Costello et al. | |
| 2002/0010615 A1 | 1/2002 | Jacobs | |
| 2002/0022984 A1 | 2/2002 | Daniel et al. | |
| 2002/0035495 A1 | 3/2002 | Spira et al. | |
| 2002/0065749 A1 | 5/2002 | Ikeda et al. | |
| 2002/0072988 A1 | 6/2002 | Aram | |
| 2002/0143564 A1 | 10/2002 | Webb et al. | |
| 2002/0156692 A1 | 10/2002 | Squeglia et al. | |
| 2003/0009253 A1 | 1/2003 | McIntyre et al. | |
| 2003/0036939 A1 | 2/2003 | Flores et al. | |
| 2003/0050824 A1 | 3/2003 | Suermondt et al. | |
| 2003/0216888 A1 | 11/2003 | Ridolfo | |
| 2004/0019577 A1 | 1/2004 | Abdel-Malek et al. | |
| 2005/0091001 A1 | 4/2005 | Lai et al. | |
| 2005/0187838 A1 | 8/2005 | Squeglia et al. | |
| 2007/0203779 A1 | 8/2007 | Tveit et al. | |

FOREIGN PATENT DOCUMENTS

| | | |
|---|---|---|
| CA | 2397628 A1 | 6/2001 |
| CA | 2425801 A1 | 4/2002 |
| CA | 2425803 A1 | 4/2002 |
| CA | 2425940 A1 | 4/2002 |
| CA | 2443648 A1 | 10/2002 |
| CA | 2459565 A1 | 3/2003 |
| CA | 2459566 A1 | 3/2003 |
| CA | 2459568 A1 | 3/2003 |
| EP | 0639815 A2 | 2/1995 |
| EP | 1162557 A1 | 12/2001 |
| JP | 60165325 | 8/1985 |
| JP | 62026510 | 2/1987 |
| JP | 02065201 | 3/1990 |
| JP | 02127952 | 5/1990 |
| JP | 03264250 | 11/1991 |
| JP | 04025350 | 1/1992 |
| JP | 05168070 | 7/1993 |
| JP | 07203120 | 8/1995 |
| JP | 08180654 | 7/1996 |
| JP | 08263546 | 10/1996 |
| JP | 09034946 | 2/1997 |
| JP | 09050599 | 2/1997 |
| JP | 07060449 | 3/1997 |
| JP | 09212555 | 8/1997 |
| JP | 10027200 | 1/1998 |
| JP | 10298351 | 11/1998 |
| JP | 11210106 | 8/1999 |
| JP | 2000015587 | 1/2000 |
| JP | 2000123089 | 4/2000 |
| JP | 2000124094 | 4/2000 |
| JP | 2001034324 | 2/2001 |
| JP | 2001092520 | 4/2001 |
| JP | 2001209676 | 8/2001 |
| WO | WO 98/44439 A1 | 10/1998 |
| WO | WO 01/15001 A2 | 3/2001 |

OTHER PUBLICATIONS

MIL-HDBK-61, Military Handbook, "Configuration Management Guidance," Sep. 1997.

Airman 2000: simplifying and optimizing aircraft maintenance, pp. 1-3.

Al-Sultan, Maintenance control via mathematical programming, Journal of Quality in Maintenance Engineering, 1995, v.1, n.3, p. 36-46, [online], [retrieved Sep. 8, 2005 via DIALOG file 15:02271208]. 9 pages.

Anonymous, maintenance mania, Manufacturing Systems, May 1998, v.16, n. 5, p. 80-84, [on-line], [retrieved Sep. 8, 2005 via DIALOG file 15:01650138]. 4 pages.

Anonymous, Bell & Howell offers maintenance kits, today, Feb. 2000, v.22, n. 1, p. 10. 1 page.

Avery, Datastream introduces new online buy system for MRO, Purchasing, Nov. 18, 1999, v.127, n. 122. 1 page.

Morris Cohen et al., "Optimizer: IBM's Multi-Echelon Inventory System for Managing Service Logistics", The Institute of Management Sciences, pp. 65-82, Jan.-Feb. 1990.

Bill de Decker, "Save on Maintenance Costs", Mar. 2000, retrieved from the web at: http://amtonline.com/publication/article.jsp?pubid=l&id=952.

Dilger, Asset management, maintenance redefined, Manufacturing Systems, Jul. 1997, v.15, n. 7, p. 122-128, [on-line], [retrieved Sep. 8, 2005 via DIALOG file 624.01167091. 4 pages.

Michael M. DiMauro, "Preventive Maintenance for Thrust Reversers", Mar. 2000.

Extended European Search Report mailed Nov. 29, 2010, for commonly owned European Patent Application No. 10185563.3. 4 pages.

Harry Fenton, "Magnetos Under PressureMagnetos Under Pressure", Jul. 2000, retrieved from the web at: http://amtonline.com/publication/article.jsp?pubid=1 &id=992.

Fulcher, ERP and PDM equals productivity, manufacturing systems, Aug. 1998, v.16, n. 8, p. 36-40, [online], [retrieved Sep. 8, 2005 via DIALOG file 15:01690148]. 5 pages.

Manny Gdalevitch, "MSG-3, The Intelligent Maintenance", Nov. 2000, Aircraft Maintenance Technology, pp. 1-6, retrieved from the web at: http://amtonline.com/publication/article.jsp?publd=1 &id=1039.

Parker A. Grant and James F. Mazeski; "Turbine Engine Maintenance-Back to Basics", Aircraft Maintenance Technology, Nov. 2000, retrieved from the web at: http://amtonline.com/publication/article.jsp?publd=1&id=1035.

Hassig, "The Case for Contract Manufacturing", Avex Electronics, Inc. International Test Conference, Huntsville, Alabama, 1995. 1 page.

Jack Hessburg, "Scheduled Maintenance Tasks: Working through the development process with the Maintenance Steering Group", Mar. 2000, retrieved from the web at: http://amtonline.com/publication/article.jsp?publd=1&id=950.

Ho, An on-line system for aircraft maintenance, Journal of Systems Management, Sep. 1994, v.45, n. 9, p. 24-27. 4 pages.

IBM Technical Disclosure Bulletin, Computer-Aided Process Planning, v.37, n. 4B, p. 605-608, [online], [retrieved Sep. 11, 2005 via EAST]. 3 pages.

International Search Report dated Dec. 28, 2001, for corresponding international application PCT/US01/32154.

International Search Report dated Jan. 2, 2002, for corresponding international application PCT/US01/32576.

International Search Report dated Oct. 4, 2002, for corresponding international application PCT/US02/09303.

Knotts, Robert M.H., Civil Aircraft Maintenance and Support; Fault Diagnosis from a Business Perspective, Journal of Quality in Maintenance Engineering, vol. 5 No. 4, 1999, pp. 335-347. [DIALOG; File 15].

Koch, Manage data to tame the maintenance tiger, Electrical World, Mar./Apr. 2001, v.215, n. 2, p. 37. [on-line], retrieved Sep. 8, 2005 via DIALOG file 624:01167091]. 4 pages.

Kroenke, David M. Database Processing: Fundamentals, Design and Implementation, 1999 Prentice-Hall; NJ. pp. 3-23.

Liberatore et al., Expert Support Systems for New Product Development Decision Making: A Modeling Framework and Applications, Management Science. vol. 41, No. 8, Aug. 1995. pp. 1296-1316.

Swanson, Computerized maintenance management systems: a study of system design, Production and Inventory Management Journal, 2nd Qtr 1997, v.38, n. 2, p. 11-15. 5 pages.

Szwedo, Increasing productivity in an AS/RS maintenance department, Production and Inventory Management Journal, 1st Qtr 1995, v.36, n. 1, p. 76-81. 6 pages.

Vijayan, Jaikumar, "Fault-Tolerant Computing", Computerworld vol. 34, 1 page, Issue 47, Mar./Apr. 2000.

Williams, "Apache Prime Vendor Support (PVS): A Case Study of Implementing The PVS Initiative World Wide in Support of the AH-64 Apache Helicopter", Thesis—United States Navy Naval Postgraduate School. Monterey, California, Sep. 2000. 70 pages.

Written Opinion dated Mar. 5, 2003, for corresponding international application PCT/US02/09303.

The prosecution history of U.S. Appl. No. 09/690,793 (matured to U.S. Patent No. 6,980,959) shown in the attached Patent Application Retrieval file wrapper document list, printed Mar. 23, 2012, including each substantive office action and applicant response.

The prosecution history of U.S. Appl. No. 09/947,024 (matured to U.S. Patent No. 7,502,744) shown in the attached Patent Application Retrieval file wrapper document list, printed Mar. 23, 2012, including each substantive office action and applicant response.

The prosecution history of U.S. Appl. No. 09/946,160 (matured to U.S. Patent No. 7,031,941) shown in the attached Patent Application Retrieval file wrapper document list, printed Mar. 23, 2012, including each substantive office action and applicant response.

The prosecution history of U.S. Appl. No. 09/825,633 (now, U.S. Pat. No. 6,738,748) shown in the attached Patent Application Retrieval file wrapper document list, printed Mar. 23, 2012, including each substantive office action and applicant response.

The prosecution history of U.S. Appl. No. 09/946,894 (now, U.S. Pat. No. 6,820,038) shown in the attached Patent Application Retrieval file wrapper document list, printed Mar. 23, 2012, including each substantive office action and applicant response.

The prosecution history of U.S. Appl. No. 09/947,136 (now, U.S. Pat. No. 7,461,008) shown in the attached Patent Application Retrieval file wrapper document list, printed Mar. 23, 2012, including each substantive office action and applicant response.

The prosecution history of U.S. Appl. No. 09/947,157 (now, U.S. Pat. No. 7,457,763) shown in the attached Patent Application Retrieval file wrapper document list, printed Mar. 23, 2012, including each substantive office action and applicant response.

The prosecution history of U.S. Appl. No. 09/946,032 (now, U.S. Pat. No. 7,457,762) shown in the attached Patent Application Retrieval file wrapper document list, printed Mar. 23, 2012, including each substantive office action and applicant response.

The prosecution history of U.S. Appl. No. 09/946,095 (now, U.S. Pat. No. 7,440,906) shown in the attached Patent Application Retrieval file wrapper document list, printed Mar. 23, 2012, including each substantive office action and applicant response.

The prosecution history of U.S. Appl. No. 10/799,914 (now, U.S. Pat. No. 7,124,059) shown in the attached Patent Application Retrieval file wrapper document list, printed Mar. 23, 2012, including each substantive office action and applicant response.

The prosecution history of U.S. Appl. No. 11/490,774 shown in the attached Patent Application Retrieval file wrapper document list, printed Mar. 23, 2012, including each substantive office action and applicant response.

The prosecution history of U.S. Appl. No. 11/806,984 shown in the attached Patent Application Retrieval file wrapper document list, printed Mar. 23, 2012, including each substantive office action and applicant response.

The prosecution history of U.S. Appl. No. 12/207,198 shown in the attached Patent Application Retrieval file wrapper document list, printed Mar. 23, 2012, including each substantive office action and applicant response.

The prosecution history of U.S. Appl. No. 12/353,408 (now, U.S. Patent No. 7,895,047) shown in the attached Patent Application Retrieval file wrapper document list, printed Mar. 23, 2012, including each substantive office action and applicant response.

* cited by examiner

MAINTENANCE, REPAIR AND OVERHAUL MANAGEMENT

BACKGROUND

This invention relates to the management of a Maintenance, Repair and Overhaul ("MRO") business.

A number of businesses focus their operations on the maintenance, repair and/or overhaul of complex equipment. Aircraft fleet and truck fleet maintenance are two commonly known businesses in this arena. In addition other business that have to maintain expensive complex machinery and other capital equipment such as fully automated manufacturing plans also require the maintenance, repair and/or overhaul of their equipment to keep the business operations running profitably.

Historically, business repair and overhaul function have evolved from the need to resolve issues on the basis of a "necessary evil" in the conduct of maintenance, repair or overhaul with a focus on a support of an existing business. This historical approach has generally been at the expense of the focus on MRO as a separate profit center, with the goals and objectives where the MRO functions not leading to optimal competitive efficiency. As the various industries depending upon fully maintained capital equipment that is compliant to industry or government standards have evolved over time, in a degree of both technical sophistication of their equipment and the oversight of regulatory agencies have increased, efficient maintenance, repair and overhaul has become of greater significance.

Additional pressures on MRO efficiencies have resulted from more industries beginning the process of outsourcing major elements of previously "in-house" maintenance efforts. Complicating the outsourcing decision have been the lack of a real benchmark by which to evaluate which function should be outsourced, as well as the fitness of any vendor being considered for an outsource. The results of the strategic shift to a business model with an opportunity for significant profit, is the need to express the operations of this business in a formal and useful way, and apply various analysis techniques to those understanding to reach continually improving levels of efficiency. Moreover, the need to apply new and innovative methods and technologies to the numerous MRO tasks drives a need to clearly understand the relationships of those tasks as well as the impact on business. Accordingly, there is a need for a focused and structured process and technology analysis method to support, improve and manage the MRO businesses.

BRIEF SUMMARY OF THE INVENTION

A framework for maintenance, repair and overhaul business management includes a first layer identifying business areas in an MRO business, a second layer identifying one or more processes within each business area and a third layer identifying one or more sub-processes within each process wherein the business area include flight operations management, maintenance execution, maintenance management, engineering and maintenance support, material management, product development, enterprise management, strategic management, and demand generation.

In various implementations, one or more of the following features may be present. The framework may be presented and discussions of maintenance, repair and overhaul management can take place based on the framework. For example, the framework can be used if the basis for discussions of maintenance, repair and overhaul management in connection with a particular business or company. The framework can be used as a basis for a diagnostic analysis for the particular business to identify gaps in the businesses approach to maintenance, repair and overhaul management. Also, the framework can be used as a basis for training personnel in maintenance, repair and overhaul management.

In another embodiment, the framework may be useful for determining what software tools may be useful for a specific MRO business. The framework may also be useful for determining how to customize specific software tools for the business.

Other features, advantages and embodiments of the invention will be readily apparent from the following detailed description, the accompanying drawings and the appended claims.

DETAILED DESCRIPTION OF THE INVENTION

Figure 1:
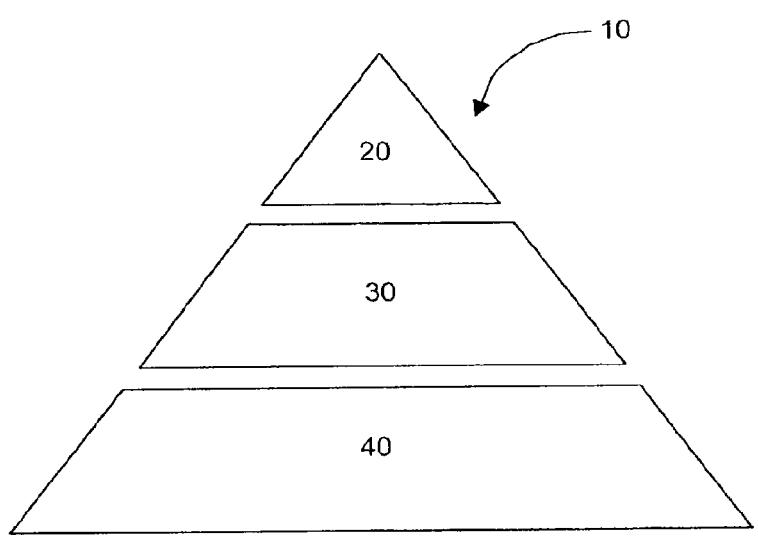
FIG. 1 represents an architectural framework for maintenance, repair and overhaul management in accordance with the invention.

Maintenance, Repair, and Overhaul ("MRO") may be defined as that class of business activities that occur "post-delivery" to a customer (i.e., once title has passed to the customer). It is not intended to encompass that activity which may occur during manufacture or pre-delivery test. The delineation helps one to understand the schedule and financial nature of MRO, and not to become improperly focused on non-MRO. One example of this is the work that results from wear and tear during aircraft production flight test (oil filter changes/brake calibration/etc.) that also occurs on a regular basis during fleet operation. The nature of the two functions are not physically different, but have different business imperatives surrounding them which change their cost profile (skill levels authorized to perform the task; hourly pay rate; etc.).

For the purposes of this invention, MRO begins once the manufacturer no longer owns the merchandise. MRO encompasses sub-processes dealing with physical aspects of the product (teardown; buildup; routing of removed items to specific physical process areas for work; tagging of components; tracking of configuration—inventorying of part and tools; etc.), with specific business functions unique to MRO (inventorying of work during initial inspections; definition of unique work sequences based on emerging tasks; accessing of "spares only" inventories; scheduling of multi-skill personnel against conflicting work needs; movement of potential work across multiple physical sites, optimizing product usability schedules vs. maintenance work requirements, etc), and with business processes which are very common to the basic manufacturing of the product (inventory of common components, payroll, shop floor control, human resource activities, purchasing, component transportation; etc.).

More particularly, maintenance, repair and overhaul activities may be considered distinct, but possibly overlapping activities, as described below. Nevertheless, when referred to generally and unless noted otherwise, use of the phrase "maintenance task" or "maintenance activity" refers at least one of maintenance, repair and overhaul of an item of equipment or a component of the item. A "component" generally unless noted otherwise means a component, a sub-component, an assembly, a system, or any other part of an item of equipment. A component may include, but need not include, one or more sub-components. An assembly may comprise a group of components that are integrated together.

Maintenance

Maintenance involves that class of work that is regular and repeatable, and is focused on keeping the operational parameters of the product within acceptable ranges of system performance. The work content tends to not be extensive for any single element, but does require attention to detail and a focus of using the information gathered during maintenance as a rough predictor and/or "pointer" to stay ahead of more serious degradation's of performance. Typical maintenance items include fluid quantities, hydraulic and pneumatic pressures, filter changes, and general inspection for pressure leaks, moisture accumulations, and cosmetic/visually obvious damage. Maintenance is usually considered to be the lowest degree of complexity of work element required to assure the fitness of the product for service.

The first task prior to physically performing any maintenance of the product is the "induction" of the product into the maintenance process. Induction requires that the product be identified as to type, usage, and configuration to allow proper and appropriate tasks to be performed. The induction process utilizes part numbers, serial numbers, and model numbers as key points of identification. Once fully identified, the product has proper maintenance requirements applied against its' specific status (hours of operation, total and incremental; mission definition; previous conditions noted in the records; etc.). The maintenance task requires detailed knowledge of the maintenance instructions/manuals, utilization of a maintenance checklist, meticulous record keeping of each task performed, and the use of any specialized maintenance tools defined by the instructions. Some items of calibrated tooling will be required. Knowledge of product operational procedures is mandatory to assure safe, efficient, and complete maintenance of the product. The use of engineering documentation (blueprints, schematics, wiring diagrams, etc.) is generally minimal, but familiarity as to location and availability of this data is required. In an aircraft setting, the most commonly found skill set is the ability to safely run engines, administer preflight system checks, quickly locate and access all filters and liquid fill locations, and the ability to communicate succinctly with flying personnel any situation which will impact their operational envelope or which raises an unfamiliar situation. In a military setting, performance of maintenance tasks is limited to those personnel with specific skills and training for the type of maintenance required and for the specific aircraft in their care.

Repair

Compared to maintenance, repair involves work items of greater complexity and duration than those required for maintenance. While some repair can be forecast with high degrees of accuracy, other repairs fall in the category known as "emergent work" and involve those tasks that are found during inspections or during other repair activities. The need to perform repairs might be determined during use of the product, with the detail nature of the repair only fully defined as a result of comprehensive inspections and/or testing. This comprehensive inspection/testing is an extended element of the induction procedure, and may require that work be authorized incrementally during induction to reach the required level of detail. It is feasible that product design personnel, quality assurance specialists, or highly skilled technicians may all be required to successfully identify all required repair activity for a given situation. It is also possible that calibrated tools or other designated assets may be required during the repair requirement detection phase of the induction process. Once a repair is determined to be required, numerous coordinated activities must occur. The work must be defined in detail, and all required components known and accessed from various inventories, suppliers, and locations. All backshop work must be defined, work orders specified, routings determined, and work scheduled within the total available capacity. The repair work must be priced, customer notified, and authorization to proceed issued. All purchased items must be procured, received, inspected if necessary, and delivered to the user. Throughout this process, all serial numbers, configurations, and end item authorization usages must be maintained to assure proper installation and reporting of configuration to the customer. Dependent upon the extent and nature of the repair, customer engineering, quality assurance, or FAA DER may be required on-site. In some selected instances, it may be necessary to remove "good" components from other end items that are in the MRO cycle to achieve short-term supply objectives (i.e., cannibalism). When this occurs, strict record keeping, transfer of serial numbers, and solid configuration management practices must be applied to assure proper replacement for the component. Repair requires greater degrees of operator/touch labor skills than normally utilized for maintenance, and the types/extent of repair work authorized at a given site will vary. Some general maintenance sites will be authorized to perform some level of repair, with the most extensive repair work only allowed at the depot level due to the availability of skills, tools, and support personnel (engineers, etc.).

Overhaul

In contrast to maintenance and repair, overhaul tasks are the most complex and time consuming of the three major categories of work (maintenance, repair, overhaul). Overhaul is also used here to cover the tasks dealing with upgrade incorporation, compliance with emergency configuration changes or validation (i.e., TCTO and the like). Characteristic of this type of work is the discussions recently completed regarding the PDM project for restoration of outer mold line/low observable coating for the B2.

The general characteristic of overhaul work that sets it apart from the others is its degree of complexity and its predictability. Overhaul requirements are seldom the result of emergent work, and are usually known well in advance of the product entering the overhaul cycle. This makes the work much more amenable to job sequence planning, master planning and optimization for resource allocation (components; people; shop space; tooling; test equipment; usage scheduling; etc.), and sets it apart from the other tasking profiles. In the ranking of this work, overhaul is much more like production factory work than is repair or maintenance. What creates complications is that within any given overhaul cycle some degree of repair work may emerge based upon inspection during induction, or configuration impacts during the overhaul cycle itself (mistakes, oversights, or unknowns).

The overhaul function is usually performed in physical facilities of some complexity, and with a large amount of work taking place simultaneously on numerous end products. Inventory control of components (new and in refurbishment), WIP control, serial number component routing to proper end items, movement and tracking of tooling and calibrated devices, and crew cycling for efficient personnel usage are all significant challenges to an overhaul function.

Overlaying all of this activity is the need to maintain meticulous configuration records of teardown, buildup, component addition/upgrade, and all back shop processes utilized against the subject components (what, who, when, process control parameters, etc.). Additionally, financial records must be carefully structured to assure that appropriate contracts and/or customer authorizing purchase orders are charged and tracked for the correct categories of work.

The present invention is applicable to all industries having MRO businesses, either as separate enterprises or business operations within a larger company. The descriptions and examples herein are focused on aircraft as the "most difficult" example of MRO. The use of the aircraft metaphor translates directly to all forms of complex product/mechanism MRO (ships; trains; oil platforms; nuclear power plants; etc) with the major changes being nomenclature for the end product being maintained, and the degree (and forms) of regulatory agencies involved with industries that utilize these various products/mechanisms. The problems and solutions do not appreciably change from industry to industry, only the percent of focus of the MRO activity that is unplanned. For example, electrical power plants may have only 30% of their total MRO work as "unplanned," while oil platforms may have 80% of their total MRO work as "unplanned."

Against this backdrop of MRO activity, the MRO framework 10 is a hierarchy of business areas processes and sub-processes that support an MRO organization's management. As shown in FIG. 1, the first layer 20 includes preferably nine business areas. In a second layer 30, each business area includes at least several processes. In the third layer 40, each process includes at least several sub-processes.

Figure 2:
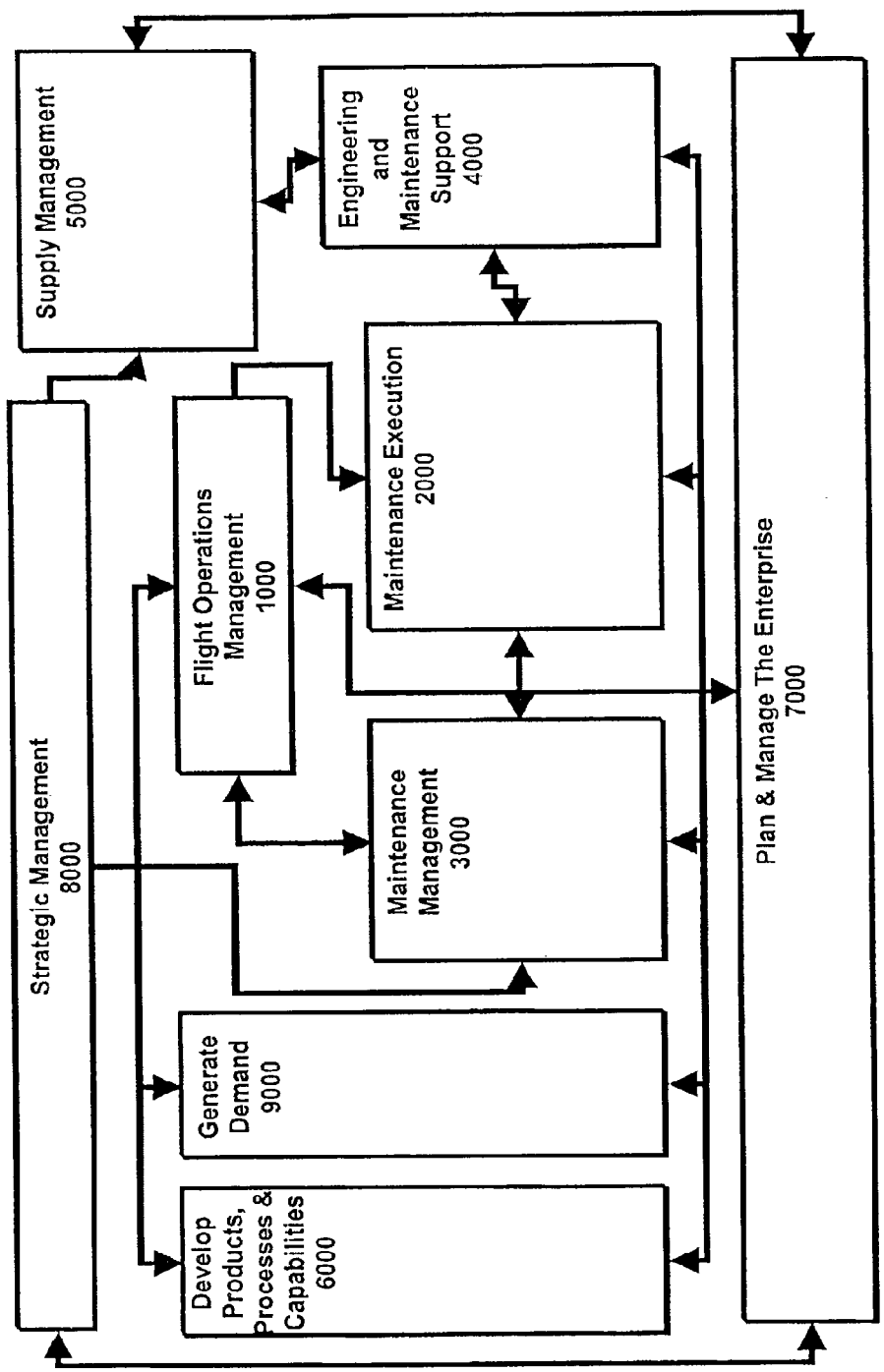
FIG. 2 illustrates further details of the architectural framework in accordance with the invention.

As shown in FIG. 2, the first layer of the MRO framework includes nine business areas. These business areas include Flight Operations Management 1000, Maintenance Execution 2000, Maintenance Management 3000, Engineering and Maintenance Support 4000, Material Management 5000, Product Management 6000, Enterprise Management 7000, Strategic Management 8000, and Demand Generation 9000.

These business areas are interconnected in this framework to represent the lines of business communication that integrate the functions of each business area into a coherent MRO organization. Each business area has lines of communication, or information flow, with other business areas. Referring to FIG. 2, the strategic management business area 8000 communicates with supply management 5000, flight operations management 1000, maintenance execution 2000, demand generation 9000, product development 6000 and enterprise management 7000 business areas. The flight operations management business area 1000 also communicates with maintenance management 3000, maintenance execution 2000 and enterprise management 7000 business areas. Material management business area 5000 also communicates with engineering/maintenance support 4000 and enterprise management 7000 business areas. Enterprise management business area 7000 also communicates with product development 6000, demand generation 9000, maintenance management 3000 and engineering/maintenance support 4000 business areas.

Figure 3:
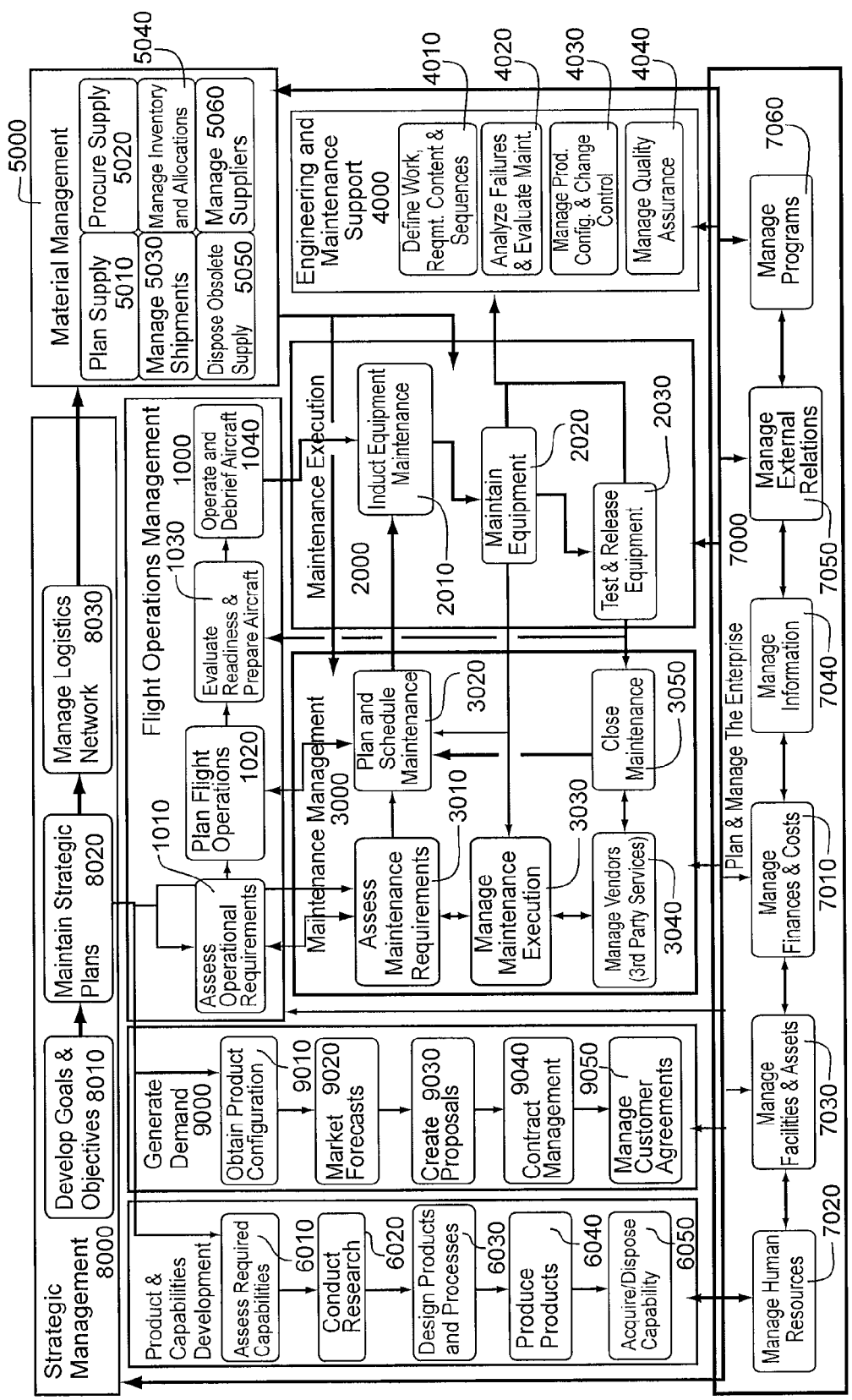
FIG. 3 illustrates even more details of the framework in accordance with the invention.

As shown in FIG. 3, each of these business areas include several processes. The processes exist at the second layer of the MRO business hierarchical framework. The lines and arrows shown in FIG. 3 represent the communications, or information flow, between the different business areas and different processes. Each process includes several sub-processes. The processes exist at the third layer of the MRO business hierarchical framework. The processes and sub-processes for each business area are described in detail further below.

Referring to FIG. 3, Flight Operations Management 1000 business area includes four processes in the second layer: Assess Operational Requirements 1010, Plan Flight Operations 1020, Readiness and Prepare Aircraft 1030, and Operate and Debrief Aircraft 1040.

Maintenance Execution 2000 business area includes three business processes: Induct Equipment Into Maintenance 2010, Maintain Equipment 2020 and Test and Release Equipment 2030.

Maintenance Management 3000 business area includes five business processes: Assess Maintenance Requirements 3010, Plan & Schedule Maintenance 3020, Manage Maintenance Execution 3030, Manage Vendors (Third Party Services) 3040, and Close Maintenance 3050.

Maintenance Management 4000 business area includes four business processes: Define Work Content and Sequences 4010, Manage Product Configuration and Change Control 4020, Analyze Failures and Evaluate Maintenance 4030, and Manage Quality Assurance 4040.

Supply (or Material) Management 5000 business area includes six business processes: Plan Supply 5010, Procure Supply 5020, Manage Shipments 5030, Manage Inventory and Allocation 5040, Dispose Obsolete Supply 5050, and Manage Suppliers 5060.

Develop Products, Processes and Capabilities 6000, also referred to as Product Development, business area includes five business processes: Assess Required Capabilities 6010, Conduct Research 6020, Design Products and Processes 6030, Produce Products 6040, and Acquire/Dispose Capability 6050.

Plan and Manage the Enterprise 7000, also referred to as Enterprise Management, business area includes six business processes: Manage Finances and Costs 7010, Manage Human Resources 7020, Manage Facilities 7030, Manage Information 7040, Manage External Relations 7050, and Manage Programs 7060.

Strategic Management 8000 business area includes three business processes: Develop Goals and Objectives 8010, Maintain Strategic Plans 8020, and Manage Logistics Network 8030.

Generate Demand 9000, also referred to as Demand Generation. Under this business area, in the second layer, the framework includes five business processes: Obtain Product Configuration 9010, Market Forecasts 9020, Create Proposals 9030, Contract Management 9040, and Manage Customer Agreements 9050.

This specific modeling approach to define this MRO hierarchical framework (both content and functional modification elements) allows for the comparison of alternatives across solution approaches (both functional and technical), and within potential method/technology implementations to enable equalized comparisons prior to actual implementation (i.e., expenditure of resources).

This MRO Framework may be used for matching specific company instances against the MRO model for purposes of "benchmarking" (i.e., comparison to industry best practices and/or world class approaches), gap analysis (i.e., determining in which areas or processes a specific company may be lacking or can benefit from improvement), measurement of efficiencies via application of specific actual performance data to the modeled process elements (i.e., If a specific company was structured per the model, what could performance look like?), and evaluation of existing technology/method/organizational approaches against a potentially different (and industry validated) process.

One embodiment the invention is the linkage of applicable software packages and technologies into cohesive process functions, integration across those functions, and access to the resulting infrastructure utilizing various technologies (including web based technologies). The invention is well suited to this approach due to its detailed description and the integration of the activities within a functional process and across multiple functions as well. The framework is primarily a functional expression of the MRO world first, and then a basis for a technical/technology expression of that same world.

For example, there are a number of software packages that may be useful for supporting the activities within an MRO business. The challenge is to determine which software is best for which activities and business processes. The MRO framework can assist in that challenge by establishing a standard business model to which software tools can be mapped at the process or sub-process level. In comparing a specific MRO business to the MRO framework, it becomes more apparent which software tools may be useful for the specific MRO business. It also becomes more apparent how to either modify the specific business to the framework model to get the business to "fit" the software, or how to modify the software to "fit" the specific business.

It is also important to note that not all of the capabilities of a specific software tool are required to achieve success for the specified application, dependent upon the individual implementation design for the total system. Additionally, the software tools listed are for illustrative purposes only, and could be replaced with similarly capable (or more robust) tools that are available, or as they become available or required.

By way of illustration, there are some primary software tools mapped to various processes, sub-processes, portions thereof, or combinations thereof in the model. One such software solution is sold as Maintenix from Mxi Technologies, located in Ottawa, Canada. Mxi Technologies specializes in software tools for maintenance management in aviation applications, is useful for the following activities: Configuration Management, Maintenance Programs (What is to be done, and in what sequence), Demand Planning, Work Execution (Material/components, and labor tracking), Product and Process Reliability, and Tool Management (for tools used to perform the maintenance tasks).

In the context of the MRO framework, the software tools from MXI Technologies are useful in the following processes: evaluate readiness and prepare aircraft 1030, operate and debrief aircraft 1040, induct equipment into maintenance 2010, maintain equipment, 2020, test and release equipment 2030, assess maintenance requirements 3010, plan and schedule maintenance 3020, manage maintenance execution 3030, manage vendors 3040, close maintenance 3050, define work requirement content and sequences 4010, manage product configuration and change control 4020, analyze failures and evaluate maintenance 4030, manage quality assurance 4040, and obtain product configuration 9010.

Another software solution is available from PTC, located in Needham, Mass. PTC provides a number of software tools for Technical Document Management, Engineering Order Management, Authoring and Release Management, and Publishing. In the context of the MRO framework, software tools from PTC may be useful to support the following processes: define work requirement content and sequences 4010, and design products and processes 6030.

More software solutions are available from SAP, located in Newtown Square, Pa. provides integrated e-business platforms for a number of business functions. These software solutions are useful for Financial Management, Material/Component Management, Purchase Ordering, Warehouse and Inventory Management, and Human Resource Management.

In the context of the MRO framework, software tools from SAP may be useful in the following processes: plan supply 5010, procure supply 5020, manage shipments 5030, manage inventory and allocations 5040, dispose obsolete supply, 5050, manage suppliers 5060, produce products 6040, manage finances and costs 7010, manage human resources 7020, manage facilities 7030, and manage programs 7060.

Still more software solutions are available from Manugistics, Inc., located Rockville, Md., which focuses on software solutions for enterprise profit optimization. In particular, Manugistics has software tools directed to supplier relationship management and supply chain management. Such software tools are useful for Capacity Planning, Scheduling and Resource Optimization, including personnel, facilities and tools, and for Material/Components Optimization.

In the context of the MRO framework, software tools from Manugistics may be useful for the following processes: plan and schedule maintenance 3020, analyze failures and evaluate maintenance 4030, plan supply 5010, plan shipments 5030, manage inventory and allocations 5040, manage suppliers 5060, and manage logistics network 8030.

In another embodiment, this invention is useful as a knowledge and/or expert tool for training personnel in the operations and management of an MRO organization. This MRO framework may be embodied in a computer-readable medium, such as removable storage media or fixed hard drive on a computer, as a program or set of instructions interlinked in a hierarchical fashion to present the details of this framework to a user. The information may be presented in a graphical user interface with a text and graphics that are hyperlinked to lower layers of the framework to provide linkages to more and more detailed descriptions of the various processes and sub-processes and activities in an MRO organization. In addition, the details may be cross-referenced and cross-linked to provide a later movement across the framework to provide a user an easy facility to develop understandings of related sub-processes across various business areas in an MRO organization. Such a framework, for example, may be established within a spreadsheet outlining the various areas, processes and sub-processes of the framework providing hyperlinks to other files and documents and presentation materials providing a detailed description underlying the operations and management of the operations in an MRO business.

Moreover, this information and expert knowledge tool may be linked to simulators and demos to provide additional training for users. Thus, this tool provides a useful network interface to a plethora of other MRO training resources.

In one aspect, the MRO Framework may be considered to be a hierarchical business process model with a variety of interrelated or interlinked business processes and sub-processes. The following detailed description is an illustration of the model for an MRO business operating in an aircraft industry. Unless otherwise noted, the business terms and sub-processes shall have their ordinary meaning as understood by one of ordinary skill in the art in the specific industry to which the framework is applied.

1000 Flight Operations Management

The first business area, Flight Operations Management 1000, includes four processes in the second layer, and nine sub-processes in the third layer. The four processes include Assess Operational Requirements 1010, Plan Flight Operations 1020, Evaluate Readiness and Prepare Aircraft 1030, and Operate and Debrief Aircraft 1040.

1010 Assess Operational Requirements

The first process is Assessing Operational Requirements 1010. This process includes three sub-processes: Manage Missions 1010.05, Establish Operational Matrix 1010.10, Review Fleet Composition 1010.15. These sub-processes provide basic workflow requirements for fleet operations information support as are well known in the art. These sub-processes primarily relate to identifying and defining flight requirements, establishing standards and checking that the fleet equipment generally complies with those standards.

1020 Plan Flight Operations

The second process in the second layer is Plan Flight Operations 1020. This process includes in the third layer two sub-processes, which are: Flight Requirements 1020.05 and Flight Scheduling 1020.10. These sub-processes provide workflow requirements for fleet operations as are well known in the art. These sub-processes include assessing short-term and long-term requirements for meeting operations objectives, and providing short-term and long-term scheduling of the end items of equipment, including capability assessments of the individual end items to meet the schedule and finding substitutes if necessary.

1030 Evaluate Readiness and Prepare Aircraft

The third process in the second layer is Evaluate Readiness and Prepare Aircraft 1030. This process includes in the third layer two sub-processes: Prepare Aircraft For Flight/Mission 1030.05 and Perform/Report Checks 1030.10. In the sub-process for preparing the aircraft for flight, the configuration is compared against the configuration required for the mission. Also, any consumables are replenished. In the sub-process for performing/reporting checks, a final clearance is given as to flight worthiness. First, a pre-flight check is made and the results are recorded. Assuming that the results of the pre-flight check do not ground the aircraft, the manifest and passenger details are recorded. Lastly, a final check of the maintenance forms are reviewed and if no outstanding maintenance actions will ground the aircraft, it is authorized for flight.

1040 Operate and Debrief Aircraft

The fourth process in the second layer of flight operations management is Operate and Debrief Aircraft 1040. This process includes in the third layer two sub-processes. The first sub-process is Perform/Record Check 1040.05. Performing and recording check involves the following: After a flight has concluded a post flight test/check cycle is performed and the aircraft is checked to ensure that it is able to turnaround and operate again without need of maintenance. Assuming that the aircraft is mission worthy (able to turnaround immediately) its stores and consumables are replenished.

The second sub-process is Record Flight Flash Mission Details 1040.10. Once the aircraft has performed a mission it's flight log is updated. After each use of the equipment a standard 'debrief' is followed is ensure all necessary lifing, billing and maintenance data is collected. The key stages of this sub-process are:

- Updating the usage information, i.e., the number of flying hours, number of landings etc.
- Recording of any noted problems by air or ground crew, such as noisy nose-gear retraction on take-off. This also includes pilots notes.
- The recording of any 'Operational Events' that occurred during the usage, such as identify if the aircraft had a 'heavy landing' or 'flew over salt water' etc.
- A check of the recorded passenger roster and cargo manifest as created on departure
- If the flight was designated as, or used any systems that were under 'in-flight' operational test requirements the results of the test must be recorded; typically this comprises of an indication of whether the system under test performed adequately or not, and if not a description of why.

Once the flight/mission details are completed the current status of aircraft systems may be assessed; discrepancies recorded against systems may 'downgrade' their capability and upcoming 'planned' maintenance may also prevent them from being used until the maintenance is complete. A check of the combined systems capability gives an overall indication of the ability of the aircraft to fulfill another flight requirement or enter maintenance.

2000 Maintenance Execution

The first layer of the MRO framework includes a second business area, Maintenance Execution 2000. Under this business area, in the second layer the framework includes three business processes: Induct Equipment Into Maintenance 2010, Maintain Equipment 2020 and Test and Release Equipment 2030. Each of these processes includes a variety of sub-processes in the third layer of the framework.

2010 Induct Equipment into Maintenance

In the third layer under the Induct Equipment Into Maintenance Process 2010, there are seven sub-processes. The first sub-process is Collect Product Engineering Data (pre-staging) 2010.05. Before the arrival of the equipment all product engineering data needs to be gathered and pre-staged. First, the most recent approved configuration of the equipment is determined. Next, the documentation describing the actual as-maintained configuration is gathered. The last documentation that needs to be gathered is that documentation which relates to any engineering changes that have been called for. Once all of the pertinent documentation has been gathered it is analyzed to identify any possible work that could emerge as a result of any discrepancies that exist between the as-maintained state of the equipment and the current as-designed/as-approved configuration.

The second sub-process is Collect Component Engineering Data 2010.10. Before the arrival of any new equipment testing and inspection metrics and procedures need to be determined for all components that are to be considered during the maintenance cycle. Any engineering change information that pertains to components of the equipment is gathered and from this data part turn-in requirements and RoR routing requirements are ascertained.

The third sub-process is Pre-Stage Maintenance Material 2010.15. In this sub-process all spares are moved into the staging areas (virtual or actual) and any material that may be needed to perform commonly occurring unscheduled (unplanned) work is placed on reserve.

The fourth sub-process is Accept Equipment Into Maintenance 2010.20. Upon arrival of the equipment a check is made to assure that the equipment matches what was expected to arrive according to contracted agreements. Once this confirmation has been done all lifing information is reviewed including equipment logbooks as well as actual inspection of the equipment to validate the lifing data. The Equipment Log book is also inspected to identify any outstanding or deferred maintenance on the equipment and to highlight any discrepancies between the recorded state of the equipment and the actual. Included in this inspection process is a systems test that will allow for the gathering of baseline readings. These readings will be used as a reference during the maintenance cycle as well as for historical, archived data.

The fifth sub-process is Inspect And Determine Status 2010.25. Inspection and determination of status refers to the series events that occur up front when equipment arrives for maintenance. When equipment arrives for maintenance an initial inspection and testing sequence is performed and a review of all engineering change/modification state documents is made to identify any changes in configuration of the equipment. Once the review of documentation is made, the actual state of the equipment to be inducted is determined and cross-referenced with the results of the documentation review. Lastly, if any discrepancies are found during cross-referencing they are captured and recorded for analysis and potential additional to the maintenance plan.

The sixth sub-process is Launch Pre-Stage Plans 2010.30. In the first step, all required resources are confirmed as being available to be pre-staged. Finally all required resources are staged either at a transaction level (in preparation for physical movement) or are actually moved to a physical staging area.

The seventh sub-process is Identify And Record Unplanned Work 2010.35. In this, the final stage in the induction cycle, a review of maintenance records is made and any discrepancies that have not been addressed are captured. Once this capture has been made the performance baseline information and the open discrepancies are recorded. The open discrepancies may contain additional work that needs be negotiated within the existing contract so at this point a finalization of this additional (unplanned) work is made. Next, a recording of performance information is logged for further review during the maintenance cycle. This data is also archived for use as an as-received baseline for future use in client negotiation. Finally an update is made of all equipment forms and maintenance records to reflect all of the recorded and archived information.

2020 Maintain Equipment

The second process of the second layer under Maintenance Execution 2000 is Maintain Equipment 2020. The process of maintaining equipment includes 17 sub-processes in the third layer.

The first sub-process is Work Planning 2020.05. This sub-process reflects the on-going management of the workload throughout the maintenance cycle. One of the main areas where MRO differs from traditional ERP is in that MRO Maintenance is dynamic and cannot be fully planned up-front. The management of the work load requires that the maintenance managers and work centers managers have a complete and accurate view of the current maintenance requirements and status, this is provided by: a review of any outstanding maintenance write ups, a review of existing work orders and a review of existing work packages.

The view must be dynamic and responsive to maintenance performed. It provides 'up to the minute' status information and facilitates priority and on-going maintenance planning. This review allows for the logical packaging of existing work into maintenance work packages, which are then assigned to the appropriate maintenance personnel.

The second sub-process is Resource Planning and Allocation 2020.10. At the beginning of this sub-process resource needs (material, tools, and tagged assets) are identified for the work to be done. Once they are identified they are reserved or have a requisition made for their acquisition. Once the required resources are obtained or reserved they are assigned and then transferred to the appropriate personnel as work requirements dictate. Depending on need Kanban containers as well as fixtures and crane crews may need to be routed to the work site. A hold may need to be placed on the work order for a number of reasons and the work may be delayed until a later date, the last event allows for this occurrence.

The third sub-process is Work Order Generation 2020.15. This sub-process allows for the generation of work orders that are either unplanned or planned and either on-equipment (still attached to the equipment) or off-equipment (no longer attached to the equipment.). The last phase of the sub-process allows for a work order to be created from an existing work order, related to the maintenance being carried out on the first work order but is carried out by a different organization or skill set. For example, should a panel be bent while removing to access the landing gear, an 'assist' work order may be raised to task the 'sheet metal' shop to repair the panel.

The fourth sub-process is Perform and Record Work on Equipment and Tools 2020.20. Before work is actually performed a review, confirmation, and update of work steps is undertaken. This process includes an analysis of the order in which work to be carried out, an analysis at the task level of each work step, and an analysis of whether or not work steps should be included. Once this analysis is completed any re-ordering of the work sequence is done. After a work step has been completed all details are recorded. These details include action taken, how the failure occurred (assuming that there was a failure), and a narrative describing at a fairly high level what work and in what steps the work was actually performed. A QA approval may or may not be needed to allow for continuance to the next work step or final clearance if the final work step has been reached.

If an Interactive Electronic Technical Publication (IETM) tool is available the technician will use the IETM to guide the work performed. The IETM contains all the necessary step and sequence information which can be used to populate the work steps recorded in the MRO system; this removes the need of storing, reviewing, including and excluding steps and task from work orders since they are built dynamically from the technician's use of the IETM.

The fifth sub-process is Work Order Routing 2020.25. In this sub-process the routing of a work order is mapped out. Initially the next work center must be identified, this is done by matching the capabilities of the work center with the required work; on some occasions more than one work center may be able to perform the work and a choice is made depending on location, work load and priorities.

Next, the identified next work center needs to be notified that there is work pending for it. This notification takes place to assure that the capacity to do the work at this center exists (skill sets are present, tools, equipment in place). Next the technicians and administrators that will be responsible for doing the work are notified that there is work pending for them. Work order status is then updated to reflect the current state of the work order (open, closed, in transit, delayed). Lastly the work order is routed to the next work center.

The sixth sub-process is Work Order "Ground Run" Recording 2020.30. A "Ground Run" is a term used when an aircraft equipment/component is tested on the ground. It refer to the testing of aircraft engines, off the wings on the ground and held by a specially designed fixture or with the engines installed on the aircraft (using the aircraft as a de-facto holding fixture). Ground runs attempt to monitor the "raw" performance of equipment/components. In the case of aircraft engines, an example of performance information to be gathered from a ground run includes power or thrust rating.

The seventh sub-process is Work Order Spare Parts Ordering 2020.35. This sub-process allows for the ordering of spares directly from the work order. If after a review of a work order is made and it is determined that additional spares will be needed over and above the ones that were pre-staged they are ordered directly. After the order has been placed its status is monitored to assure timely delivery and expediting of the order.

The eighth sub-process is Work Order Material Resource Management 2020.40. During and before the commencement of work all resources that are needed to perform the work must be managed. First, needs relating to support and ground equipment are reviewed on the work order. Some items of support equipment, such as engine cradles etc. must be pre-booked to ensure availability at the time the work order is commenced; failure to adequately plan the support and ground equipment requirements will result in a work delay.

A reservation and/or assignment is generated directly from the work order to allow for ready access and a speedy delivery.

Tools, support, and ground equipment are closely tracked to assure availability for completing needs. In particular small items and tools are closely tracked through the use of tool control. All tools 'checked out' to a technician or Work Order must be returned before the work order can be authorized as complete. This is to ensure that no tools are 'lost' or 'left' inside the equipment where they may cause a safety hazard.

The ninth sub-process is "Bit & Piece" Recording 2020.45. This process details the requirement to document all Bit and Piece parts (i.e., consumables) used for each work order (i.e., nuts, bolts, etc.). This provides a count of specific Bit and Piece Parts used for each work order and assists in the development or parts and stores requirements by work order and job.

The tenth sub-process is Cannibalization 2020.50. Circumstances may necessitate removal of a part from one structure to fulfill a spares need of another structure. This may be necessary due to discontinuation of spares production, a limited number of spares produced, unacceptable delivery date etc.

The need for a cannibalization is established only after all other routes to satisfy the parts request have been attempted. The replacement must have been placed on order and a 'rejection' or 'back-ordered' notice must have been issued. Once these conditions exist a cannibalization may be authorized to satisfy the parts request and a suitable 'Donor' item of equipment is identified that has the required parts installed on it of the correct modification state and serial number, lot range etc.

Once the removal has taken place it is recorded and either the original 'Back-order' is rerouted to satisfy the now missing part on the Donor of the Cannibalization or a replacement spare part order is generated to assure replacement of the cannibalized part.

The work order that recorded the removal of the cannibalized part from the 'Donor' is then placed on hold until a part arrives to replace the part that was removed; this insures visibility of the cannibalization action and provides a work order for the recording of the installation of the replacement part when it is finally received. Lastly, the cannibalized part is installed onto the receiving structure.

The eleventh sub-process is Local Spares Re-Routing (Tail Number Bin Swap) 2020.55. If there is a high priority need for a part, a review is made of on-hand spares and priorities are examined to ascertain if parts allocated to one tail number may be used to fulfill the high priority need of another. If it is determined that it is appropriate to reroute the donor spare to the high priority work order, it is done and a spare part order rerouted to the donor bin to assure replacement.

The twelfth sub-process is Component Removal 2020.60. This sub-process describes the removal and transfer of a part from a piece of equipment. First, the structure that will have the item, structure, component etc. to be removed is identified, and then the item, structure etc. to be removed is identified and the removal is recorded. The item that has been removed is then routed for repair and if the item is to be placed back on the original structure it is tracked as same on/same off. Finally, the item is transferred or turned in.

The thirteenth sub-process is Component Installation 2020.65. This sub-process describes the installation of a part onto a structure. First, the structure to receive the installation is identified as well as the component to be installed. Next, the installation is validated against the Logical Build to assure that the resulting structure conforms to the approved configuration. Finally, the installation is recorded.

The fourteenth sub-process is Track Human Resources Time and Attendance 2020.70. Human Resources tracks time and attendance by recording technicians assigned to work, by time on work order, and by time to complete individual tasks.

The fifteenth sub-process is Close-Out Work Order 2020.75. In closing out a work order a review of work order completeness must be performed before the work can be authorized as complete. Any maintenance tasks that have been deferred and need to be rescheduled are done so based upon their initiating conditions. Initiating conditions can be defined as those conditions under which additional maintenance needs were discovered, i.e., while removing and installing a UHF radio, corrosion was discovered on a mounting bracket—in this situation the initiating condition was the remove and install task. Finally, the status of the work order is updated.

The sixteenth sub-process is Monitor Work Progress and Status 2020.80. After reviews are made of equipment status, work package status, work order status, and WIP status work order estimates are updated which lead to an update of work order status. Depending on work order status there may be a need to delay the work order or defer the work requirement until a later date.

The seventeenth sub-process is Integrate Completion of Fabricating with Assembly Needs 2020.85. If fabrication of spares is necessary the completion of fabrication and delivery are scheduled to support with assembly need, i.e., "Finish building it and deliver it no sooner than we need it."

2030 Test & Release Equipment

The process of Test & Release Equipment includes two sub-processes. The first sub-process is Test and Release Equipment and Tools 2030.05. At the end of the maintenance cycle final testing and the recording of results takes place to assure proper lifing and to assure that there exists historical data pertaining to the final state of the equipment at the time of delivery. Once this data is recorded the work is declared "complete" and all appropriate forms are filled out to reflect this event. The customer's approval as to the acceptability of the work that has been performed is obtained and upon receipt of this acceptance all remaining work is closed out. Next, all of the maintenance forms and the utilization histories are updated and the configuration data is changed from "WIP" to "Deliverable." Finally, all maintenance data is collected and archived for future reference.

The second sub-process is Release Equipment and Tools 2030.10. Once work has been completed all work orders, maintenance forms and schedules are reviewed and QA'd. Next, a review of outstanding maintenance actions is made to assure that any outstanding work to be done is accounted for and that the air worthiness and mission capacity of the equipment is not affected to an unacceptable level. Next, any "In-Flight" operational test requirements are identified and clearly noted. Lastly, the equipment is released back to the operators and tools released back into inventory.

3000 Maintenance Management

The first layer of the MRO framework includes a third business area, Maintenance Management 3000. Under this business area, in the second layer the framework includes five business processes: Assess Maintenance Requirements 3010, Plan & Schedule Maintenance 3020, Manage Maintenance Execution 3030, Manage Vendors (Third Party Services)

3040, and Close Maintenance 3050. Each of these processes includes a variety of sub-processes in the third layer of the framework.

3010 Assess Maintenance Requirements

The first sub-process is Incorporate New Requirements 3010.05. Incorporate new requirements are those activities that evaluate maintenance requirements to be included in the maintenance program. New, changed, updated or removed maintenance requirements arise from several sources including:

- development of new capabilities, this covers the on-going changes to the planned maintenance cycle brought about by the development or introduction of a new capability such as the introduction of a new system on an aircraft, a new test bed, or even a new aircraft entirely,
- published by Original Equipment Manufacturer (OEM) or regulator, such as the FAA mandating an inspection of all 747 central fuel tanks
- engineering changes which may be developed internally, such as the actions required to install 'seat back video' units.

All of these requirements must be incorporated into the maintenance process, and documented in the maintenance plan.

The second sub-process is Continuous Improvement 3010.10. Continuous Improvement revolves around the identification of opportunities to improve the effectiveness and efficiency of the maintenance program. Maintenance requirements based on continuous improvement initiatives are the focus of this process. Quality Assurance data (either from an overall QA perspective on maintenance processes as well as from flight operations quality assurance) and failure & maintenance records are essential parts for continuous improvement-based maintenance requirements.

The third sub-process is Update Maintenance Schedule 3010.15. Updated maintenance schedules must be published with enough frequency to keep personnel aware of the equipment maintenance timetable. When an update is published all previous versions become obsolete and must not be used. Careful configuration management of the published schedules is required to ensure that all equipment are being maintained to the latest standard.

The fourth sub-process is Baseline Fleet/Equipment Details 3010.20. Determine the size and composition of the fleet and equipment based on acquisitions, disposals, deployments, etc. since the last baseline. These details are updated from the strategic fleet management plan that compares current against required capability and buys or sells equipment as necessary; in addition any equipment 'losses' must be taken into account.

The fifth sub-process is Baseline Equipment Utilization 3010.25. Baseline Equipment Utilization involve the identification of maintenance requirements based on the fleet's utilization levels—that is, how the fleet is used stipulates how often and what type of maintenance needs to be completed.

3020 Plan & Schedule Maintenance

The first sub-process is Plan Maintenance Schedule 3020.05. An assessment of the maintenance facilities in terms of capability and capacity (e.g., facilities, personnel, etc.) is the focus of Plan Maintenance Schedule. The results will determine the baseline maintenance plan, which outlines the feasible maintenance work and availability to perform the feasible maintenance work for each maintenance facility—internal as well as external (i.e., contracted work that utilizes third party facilities).

The second sub-process is Planning of Schedule and Capacity 3020.10. This process involves the activities/events of scheduling a maintenance plan. The maintenance plan describes the type of work required at what intervals (i.e., time- and usage-based or preventive maintenance/PM) or due to what triggers (e.g., trend-based or predictive maintenance/PdM). A schedule of when the maintenance plan should actually occur (i.e., the specific dates) is then determined, which is the focus of this process.

The third sub-process is Schedule Process Elements 3020.15. To assure that the maintenance cycle proceeds smoothly a schedule needs to be developed to assure that all required parts, tools, specially trained personnel, and test equipment are available when needed. Also, to assure that work is completed in a timely manner QA validation and customer metrics/deadlines must be established.

The fourth sub-process is Plan and Provision Material 3020.20. This process prepares the materials required for maintenance work based on a bill-of-work, which outlines required maintenance work and its associated required materials.

The fourth sub-process is Authorize Assignment of Work Order to Personnel 3020.25. Authorize Assignment of Work Order to Personnel refer to the activity of assigning specific personnel (e.g., having special certification, skills, etc.) to a defined work.

The fifth sub-process is Assign Support Equipment 3020.30. Assign Support Equipment refers to the activities related to the assignment of tools used for maintenance work support (including testing devices) for authorized planned and scheduled work orders.

The sixth sub-process is Kit and Issue Material 3020.35. An analysis is made to determine what materials, components, tools, and tagged assets will be needed to complete a work order and either a reserve is placed on them or a requisition is generated if they are not available directly. Once this has been done a kit is set up and the kit is issued.

The seventh sub-process is Initiate Re-Planning and Re-Scheduling per Unplanned Work Orders 3020.40. If at any time unplanned work is identified, a baseline plan needs to be developed for either rolling in this new work or scheduling it for a later date at this point a plan is developed but not acted upon.

3030 Manage Maintenance Execution

The first sub-process is Perform Performance Reporting, Analysis, and Corrective Action 3030.05. This Process describes the requirement for specific measurable data and analysis to evaluate the organizations Key Performance Indicators and the established goals of the organization.

The second sub-process is Plan Project 3030.10. The Project Planning process outlines those activities involved in preparation of executing maintenance projects. These projects include one-time major maintenance program either mandated through regulatory requirements or continuous improvement/reliability engineering implementations.

The third sub-process is Plan Capacity 3030.15. Capacity Requirements Planning (constitutes the process for carrying out capacity planning, evaluation and capacity leveling. Using the available capacity in a work center and the capacity requirements generated by orders, we can evaluate facility utilization. The available capacity specifies the possible work center output per workday. Multiple capacity categories can be defined for one work center hanger or site. Capacity requirements are generated during lead-time scheduling and specify the distribution of individual service requirements that require the facilities available capacity.

The fourth sub-process is Perform Production/Facility Master Planning 3030.20. This sub-process refers to the Performance of Maintenance facility master planning.

The fifth sub-process is Establish Visibility of Sparable Items for Maintenance Schedule 3030.25. Authorize Assignment of Work Order to Personnel refer to the activity of assigning specific personnel (e.g., having special certification, skills, etc.) to a defined work.

The sixth sub-process is Identification of Sparable Items 3030.30. This sub-process requires the identification of separable items. This process is required for accurate baseline inventory counts, materials planning, materials ordering, pre-staging and maintenance execution planning.

The seventh sub-process is Track Assets by Contract Ownership 3030.35. When assets are purchased they are assigned to a contract. The asset belongs to that contract until utilized or until formally transferred to another contract for use. Contract identification/re-identification transactions are tracked and audited by this activity.

The eighth sub-process is Maintain and Track Assets 3030.40. This event refers to the maintenance, location and disposition of tagged assets (e.g., tools and test equipment/calibration devices).

The ninth sub-process is Plan Budget Allocations 3030.45. Plan Budget Allocations is the identification of work requirements by work area and associated costs, upon identification of baseline costs budget planning can be accomplished and required budgets can then be dispersed to the appropriate cost and work centers.

The tenth sub-process is Collect Production Data 3030.50. Collecting Maintenance and execution data provides the organization with detailed requirements for the planning, conducting and review of execution of work orders across the business. Each event is fundamental to planning and budgeting of the Maintenance and Engineering function.

3040 Manage Vendors (Third Party Services)

The first sub-process is Transfer Equipment/Asset to Third Party 3040.05. This sub-process describes the activities completed when transferring an aircraft or rotable to service providers for the completion of specific work. These activities include sending equipment data, work requirement data, configuration data and management information.

The second sub-process is Monitor Third Party Work 3040.10. This sub-process describes the activities completed when transferring an aircraft or rotable to a service provider for the completion of specific work. During the course of third party work, regular status updates are received including such information as time to completion and disposition of item. When the job has been completed, data is received describing the maintenance performed including repair and replacement information. If parts were replaced, configuration updates and changes are received and documented.

On-going status and progress information is essential if accurate Estimated Time to Complete is to be maintained. Without up-to-date information problems and delays cannot be proactively managed.

The third sub-process is Receive Equipment/Asset from 3rd Party 3040.15. This sub-process describes the activities completed when transferring an aircraft or rotable to a service provider for the completion of specific work.

When the item is received from a 3rd party it is inspected and tested to ensure that the contracted maintenance was performed correctly and there was no damage during shipping. The maintenance forms and utilization history are then checked and updated if necessary with the information from the 3rd party vendor. Information about the manner in which the 3rd party vendor performed the service is then collated, including on time accuracy and quality of work. This data can then be used to assess overall performance of the 3rd party.

3050 Close Maintenance

The first sub-process is Record Technician Hours 3050.05. This sub-process refers to collecting activities necessary to obtain technician work hours by work order or project. The recording of hours provides a baseline to estimate effort for similar projects or work orders. By establishing a baseline for effort maintenance planners can more accurately assign projects and predict work order completion. Additionally, technician hours will provide important information for the development of workforce planning and hiring models.

The second sub-process is Finalize Project Financials 3050.10. This sub-process refers to the activities required to finalize financial data of a specific maintenance project. This includes the identification of work hour expenses, contractor expenses, third party expenses, supply and stores expenses, cost of aircraft out of service, travel expenses and other T&I. These expenses will provide a detailed and roll-up snap shot of the project expense. Project expenses should be routed to the appropriate organization, which will then post expenses and begin the final payments or collections for the project.

The third sub-process is Close Project Accounts 3050.15. This sub-process refers to the activities required to close the financial data of a specific maintenance project. This includes the identification of expense accounts such as: work hour expenses, contractor expenses, third party expenses, supply and stores expenses, travel expenses and other T&I. Outstanding accounts will be identified to ensure all expenses related to the project have been identified, reviewed and included in the overall expense of the project. The project financials will then be closed with no additional expenses accepted.

The fourth sub-process is Perform Billing Cycle 3050.20. This sub-process refers to the way in which contract maintenance services are billed. The billing cycle is similar to that of other departmental and organizational billing cycles. Service are provided based on a service level agreement, services are billed based on the contract and accounts receivables bills for the service performed. A maintenance order can be settled to a cost center, fixed asset, project, G/L account or another order.

4000 Engineering and Maintenance Support

The first layer of the MRO framework includes a fourth business area, Maintenance Management 4000. Under this business area, in the second layer, the framework includes four business processes: Define Work Content and Sequences 4010, Manage Product Configuration and Change Control 4020, Analyze Failures and Evaluate Maintenance 4030, and Manage Quality Assurance 4040. Each of these processes includes a number of sub-processes in the third layer of the framework.

4010 Define Work Content and Sequences

The first sub-process is Project Planning 4010.05. The Project Planning sub-process outlines those activities involved in preparation of executing maintenance projects. These projects include one-time major maintenance program either mandated through regulatory requirements or continuous improvement/reliability engineering implementations.

The second sub-process is Optimize Standard Work Order Templates (Including Unplanned Work) 4010.10. A standard work order template is a model from which all standard work orders will be based upon. That is, all work orders should have a common "look and feel" that is based on this template. Work order templates are developed for both planned and unplanned work (e.g., emergencies), and for each specific work type due to be performed.

It is recommended that periodic review of standard work order templates be performed on a regular basis. Improvements should be made around efficiency and effectiveness of the standard work order templates as it applies to work execution and management. Inputs for improvements can be initiated by end-users' inputs (e.g., mechanics, technicians, supervisors, etc.) or through a review board. It is also recommended that while review and improvements are conducted, adherence to regulatory requirements, overall/strategic business objectives, and configuration changes (through technical orders/directives) must be emphasized.

The third sub-process is Re-Validate Work Instructions to Configuration Requirements 4010.15. Upon configuration changes or due to routine efforts on improving maintenance execution (e.g., through reduction in information gap around equipment configuration information currency), work instructions must be validated for accuracy as well as efficiency and effectiveness.

This sub-process emphasizes the review and validation that work instructions conforms to the configuration requirements. As such it is a continuously repeating process that is performed on a periodic/regular basis.

The sub-process begins and ends with confirming whether or not work instructions are in conformance to configuration requirements. In order to ensure conformance, configuration changes must be closely monitored, parts requirements for the updated configuration must be confirmed, the physical maintenance build must be established/updated accordingly, maintenance requirements must be modified to configuration specifications, and the actualization of the approved configuration changes must be monitored.

The fourth sub-process is Manage Work Documents 4010.20. This sequence of events allows for the managing of all work documents relating to the performance of work. These documents may include, but is not limited to configuration data, TCTO, TO, AD, engineering schematics, historical, and measurement data. These documents are staged, issued, updated, gathered, and re-archived.

The fifth sub-process is Create Job Order 4010.25. This sub-process involves the activities around job order creation. Maintenance tasks are identified and job orders are defined. Then, the master work-schedule is updated based on all required, routine/planned jobs. Finally, the job orders are pre-staged so that it is ready for transaction upon execution dates.

The sixth sub-process is Define Maintenance Tasks 4010.30. Define Maintenance Tasks refers to those activities that define the specific tasks/steps required for a given work order. In addition, this sub-process also involves the continuous monitoring and updating of theses tasks is included within the define maintenance tasks, hence the loop-back flow.

Once a task is defined and detailed, triggering conditions and tolerances are defined to indicate when the task must be performed. Additionally, manuals and/or reference materials to support the execution of the tasks are defined. Finally, since the each maintenance task is dependent on a work order, each task will be grouped to a work orders and maintenance schedule for periodic/planned execution.

The seventh sub-process is Define Default Work Orders 4010.35. Default Work Orders are the set of maintenance work that are expected to be performed. This sub-process refers to those activities that define the default work orders that are required for a given type of maintenance work. For example, during a minor service or flight-line checks, certain types of work orders will be automatically produced for the required maintenance work. These work orders are default work orders for the minor service of flight-line checks.

Once a default work order is defined, maintenance tasks (or specific activities to accomplish the required work) are associated to the work order (refer to sub-process Define Maintenance Task for the development of maintenance task and its associated details). Work profiles (i.e., resource requirements) for the work order are also identified in this sub-process.

The eighth sub-process is Define Default Work Profiles 4010.40. Work Profiles outline the characteristics of a work order. That is, it specifies the type of supporting manuals required, the types of experts/technicians/mechanics required, the parts/materials required, the tools/assets required, as well as the metrics to measure the quality of work performed for a specified work order.

The ninth sub-process is Define Default Work Steps 4010.45. Work Steps details the steps required to accomplish specific tasks within a default work order. That is, it specifies the type of supporting manuals required, the types of experts/technicians/mechanics required, the parts/materials required, the tools/assets required, as well as the metrics to measure the quality of work performed for a specified work order task.

The tenth sub-process is Task Manual Definition 4010.50. Task Manual Definitions refers to the activity of defining manuals required to support a specific task and managing the relationship. That is, for a given task, what are the sets of supporting documents required to enable proper execution and completion of the task?

The eleventh sub-process is Plan Maintenance Schedule 4010.55. This sub-process refers to the activities around the planning of a maintenance schedule from the perspective of defining work sequences.

4020 Manage Product Configuration and Change Control

The first sub-process is Track Requirements Additions, Deletions, or Alterations by Tail Number in Work 4020.05. This sub-process is concerned with the tracking/recording (for audit trail purposes) of any configuration changes on a specific tail number. Alterations in the form of Technical Orders/Directives from OEM (Original Equipment Manufacturer) or FAA (Federal Aviation Administration) are recorded and the status of its realization is tracked/monitored closely for regulatory compliance purposes. Additionally, maintenance improvements are added, deleted, or altered.

The second sub-process is Audit Configuration Trail on a Regular Basis 4020.10. As with any auditing process, this process centers around the reconciliation of actual vs. recorded/database information. Specifically, it is the gap analysis of the configuration information in the equipment configuration database against actual configuration as well as those technical orders/directives relating to configuration changes from Original Equipment Manufacturer's (OEMs) or Federal Aviation Administration (FAA). Once a strategy of "when," "where," and "how" the audit process is going to take place, configuration information will be reconciled. Where gaps exist, work leading to conformance to the most valid configuration may be in order.

The third sub-process is Manage Configuration Change Requirements Library 4020.15. All configuration change requirements are managed through a library system, where all configuration change information (paper or electronic) are kept and managed. This sub-process outlines the activities involved in the management of the configuration change requirements library.

To manage a library of information the sub-process begins with developing a method or system to track documents/information/knowledge capital. For example, in public libraries one would find the library of congress system for identifying specific books and journals.

Once a method is defined, required information (i.e., configuration change requirements) will be gathered with all information being accounted for using the defined library system/method. Other library functions will also be performed, including: information archiving, retrieval and distribution of a requested information/knowledge capital (i.e., configuration change requirements), and version control.

The fourth sub-process is Manage Equipment Logical Configuration 4020.20. The logical configuration describes the hierarchical structure of an item of equipment (i.e., aircraft) using generic descriptors, rather than specific equipment part number and/or serial number. The logical configuration describes the major components and parts that make-up an equipment/end-item. Key activities include: (1) Structure Definition: Defining the equipment's parts and components; (2) End-Item Description: Defining the specific tail-numbers for a given structure; (3) User Reference: Defining the codes used in the structure and end-item definition, as well as how it maps back to industry standard codes (e.g., ATA); and (4) Version Control: Ensuring configuration updates are recorded properly and released for incorporation to the end-item.

The fifth sub-process is Engineering Change Development 4020.25. Engineering changes are modifications to an item of equipment (aircraft configuration/design, parts, and components) that are initiated as a result of regulatory requirements (e.g., FAA), Original Equipment Manufacturer (OEM) recommendations, or reliability/continuous improvement initiatives.

The Engineering Change Development sub-process addresses the activities associated with the development of Engineering Change—from identification of engineering change requirements, all the way through the authorization for executing/completing the approved engineering changes.

The sixth sub-process is Engineering Change Application 4020.30. Upon implementation authorization, all required equipment engineering change shall be released (i.e., publicized to the organization for the purposes of awareness and implementation planning). The Engineering Change Application sub-process focuses on those key activities/events around the release and scheduling of the required engineering changes.

The seventh sub-process is Manage/Monitor Engineering Change 4020.35. To ensure proper execution and completion of a required engineering change/modification, proper management/monitoring of the engineering change execution process is mandatory. This sub-process emphasizes the key activities/events around the management/monitoring of engineering change execution and completion.

Upon initiation of the engineering change process, constant evaluation of the equipment must be made for the purposes of reviewing whether or not the equipment have been completely modified per planned engineering changes. Any non-compliance cases must be identified and, when necessary, "Grounding Notice" (i.e., notification of lacking air-worthiness) will be issued. Otherwise, assuming all work has been done to requirements specification and meets FAA requirements on air-worthiness, the engineering change work can be closed.

4030 Analyze Failures and Evaluate Maintenance

The first sub-process is Compile Data 4030.05. This sub-process refers to the data collecting activities necessary to compile data when identifying and analyzing maintenance failures. Data will be collected from a variety of sources and may include but is not limited to OEM records, work orders, flight logs, discrepancy reports and investigation reports.

The second sub-process is Collate and Process Data 4030.10. This sub-process refers to the activities required to establish a baseline database warehouse to enable report generation, queries and analysis of maintenance failures. The sub-process requires the collection, collation and population of various data sources for the population of the warehouse.

The third sub-process is Analyze and Report 4030.15. This sub-process refers to the activities required to perform an analysis of information for the evaluation of specific and overall maintenance and engineering failures. This specific sub-process details the steps required to produce failure trending reports and analysis supporting initial cause analysis and problem identification.

4040 Manage Quality Assurance

The first sub-process is Monitor and Investigate Maintenance 4040.05. Monitor and Investigate Maintenance Exceptions refer to Quality Assurance activities that attempts to ensure executed maintenance work has been performed according to a set acceptance level (usually defined by regulatory bodies such as Federal Aviation Administration and/or Original Equipment Manufacturer). This sub-process emphasize further on discovering cases of discrepancies or exceptions made to the execution of a planned maintenance work. Once identified, it is made visible to the organization (maintenance department in specific) to ensure accountability and proper resolution. Action plans are then made to rectify any issues around the discrepancies that were identified.

The second sub-process is Flight Operational Quality Assurance (FOQA) 4040.10. Flight Operations Quality Assurance (FOQA) is a system that enables training captains and safety officers to understand the operational performance of their fleet. In this way training can be focused to produce optimal operational performance. Risk and defect trends can also be managed through FOQA and in this way costly incidents can be avoided.

The Flight Operations Quality Assurance sub-process refers to the continuous activities relating to the analysis of aircraft/fleet operational performance. Flight operations data are recorded and downloaded for analysis. The objective of the analysis is to find risk and defect trends associated with the aircraft/fleet and develop solutions/recommendations to mitigate costly incidents. FOQA data includes not only input from flight data recorders but also information from all potential safety sources, such as air traffic control and maintenance shop floors.

The third sub-process is Safety Management Systems 4040.15. Managing safety is the focus of Safety Management Systems sub-process. Assessments are to be conducted, possible hazards should be highlighted, risks must be analyzed, and corresponding mitigating actions will be identified. Meanwhile, records of all safety assessment findings and solutions should be recorded for meeting regulatory and Original Equipment Manufacturer's requirements to avoid possible penalties or termination of warranty.

The fourth sub-process is Continuous Maintenance Improvement 4040.20. Quality Assurance activities (includes: monitoring maintenance exceptions/discrepancies, flight-ops quality assurance, and safety quality assurance) produce action plans that aim at improving quality. This sub-process concentrates on the implementation of those action plans. It starts with the identification of QA Actions, followed by developing an implementation plan, and ending with the actual implementation and the monitoring of the implementation.

5000 Supply Management

The first layer of the MRO framework includes a fifth business area, Supply (or Material) Management 5000. Under this business area, in the second layer, the framework includes six business processes: Plan Supply 5010, Procure Supply 5020, Manage Shipments 5030, Manage Inventory and Allocation 5040, Dispose Obsolete Supply 5050, and Manage Suppliers 5060. Each of these processes includes a number of sub-processes in the third layer of the framework.

5010 Plan Supply

The first sub-process is Analyzing History and Forecasts 5010.05. This sub-process centers around the review of historical information of supply usage/demand and performance of previous demand forecasting. The business objective is to create the most accurate forecast of customer demand possible to drive the creation of supply plans in order to meet the demand.

This sub-process involves the evaluation of prior forecast with respect to actuals (Check Forecast Performance), updating of future forecasting based on new information (Receive New Information and Update Forecast), developing a strategy for analyzing new forecast (Set-Up to Analyze Forecast), and manipulating the forecast to derive the final expected demand (Analyze and Manipulate Forecast).

The second sub-process is Building and Managing Loads 5010.10. The Build and Managing Loads sub-process, which includes accurate demand levels with actual lead times, and recommended shipments are created by the Supply Plan. From these shipments, loads may be then created on the basis of available inventory levels, vehicle capacity, and destination availability.

The third sub-process is Closing the Period 5010.15. This sub-process aims at ensuring balanced and updated financial information at the appropriate period-end. It will assist the process of reporting financial transactions, on-going financial processes, and account revaluations.

The basic steps required to complete a period end close are outlined below. These steps are not always completed in this order.

Update Current Settings: Where required, update posting period parameters to reflect the next posting period. Any sub-systems where the current period defaults as the posting period need to be updated to reflect the period change. This is necessary to prevent transactions from being incorrectly posted to the prior period. If necessary, manually update the currency exchange rate in multi-currency systems. Assets should be depreciated at this stage. Work in progress (WIP) should be settled to the correct account(s). Some integrated financial systems also require the sub-ledgers to be closed via batch update programs prior to closing the general ledger. Whenever possible, the sub-ledgers should be closed prior to running the preliminary financial reports. This will increase the accuracy of the initial run of reports, reducing the need for adjusting entries.

Interface External Data: If required, interface external system or sub-ledger transactions into the general ledger. Review and validate entries made by operational systems to prevent unnecessary reclassing of expenses later in the process. In certain systems, the interfacing of these transactions delays closing due to the length of time necessary to run the interface program. If this situation arises, there are two strategies which may improve month end close times.

A. Design the period-end schedule so that such updates are performed periodically throughout the month. This will reduce the number of transactions which must be interfaced at period-end, decreasing the time necessary to close the books. This method is preferred when the volume or amount of the remaining transactions is difficult to predict.

B. Schedule the interface to run several days before the true period-end and create an accrual for the remaining transactions. This method is preferred when the volume or amount of the remaining transactions is predictable.

Revaluation/Accrual/Reclassification Process: All foreign currency accounts in Accounts Receivable, Accounts Payable, and the General Ledger must be revalued to reflect fluctuations in the exchange rates. For those items which are open, reversing journal entries should be posted to the G/L. These journal entries can be corrected once the actual items have been posted. Accruals should be entered for each incomplete transaction and reversed as the transactions are completed. Inventory should be revalued against standard costs during this step. Although inventory revaluation is not necessary each period-end, it should be performed regularly to avoid large year-end adjustments. Customer credit balances and vendor debit balances should be reclassified to A/P or A/R respectively to reflect their impact on the balance sheet.

Allocate Indirect Costs: The accounting department may choose to allocate indirect costs across different cost centers. The method of this allocation must be agreed upon by both accounting and the various departments which will receive portions of these costs. If possible, avoid basing the allocations on complex formulas or statistics that are not available early in the period-close cycle. Simple allocations performed early in the close cycle are necessary for a timely closing process.

Process Pre-Close Reports: After all preliminary transactions have been entered, run the trial balance, balance sheet, profit and loss statements, and cost and margin reports. These reports will provide the basis for various departments to review their financial performance. Simplifying and standardizing these period-end reports will decrease closing times. Route these reports to the appropriate departments for review.

Review Reports: Various departments review the pre-close reports to determine any adjustments or journal entries that need to be made. These departments can also begin to analyze cost variances.

Enter Adjusting Entries: The accounting department enters the proposed journal entries to adjust or reclassify expenses. To prevent unnecessary rework, a control method should be instituted to prevent the inaccurate reclassification of expenses. An example might be to require authorization on each adjustment from all affected departments.

Run Final Financial/Control Reports: Produce the final balance sheet, profit and loss statements, and cost and margin reports. These reports should be distributed to the various departments.

Close Period: Close the period to back posting. In many systems, it is recommended to perform a limited or soft close which will allow the back posting of journal entries to that period should the need arise. After this close takes place, any further adjustments will require balances to be recalculated and reports to be reproduced. The period can be closed completely at a later date (next period-end or year-end). The total number of periods in the fiscal year is determined during the implementation of the financial system. While some systems limit the number of periods to twelve (corresponding to a calendar year), many systems allow for additional periods. These additional periods are used for adjustments, which occur after the fiscal year has ended, or for journal entries which are not period specific.

Process Year-End Transactions: (Note: This step occurs only during year-end close.) During the year-end close, the balance of the cost and revenue accounts needs to be carried forward to the correct balance sheet accounts. In multi-currency systems, an adjustment may need to be made to correct differences caused by the different currency exchange rates used with the balance sheet and P&L statements.

Implementing this business sub-process will provide timely and accurate financial information at period-end. There are opportunities within this sub-process to automate procedures and processes, which will reduce human intervention. The information that results from this sub-process will provide a strong basis for decision making and planning.

The fourth sub-process is Creating Replenishment Plans 5010.20. Constrained Supply Planning begins by developing a Replenishment plan, a list of the ideal allotment of goods for manufacturing plants and distribution centers based on current inventory, safety stock levels, products in transit, and current production schedules.

The fifth sub-process is Forecasting Aggregation and Reconciliation 5010.25. The sub-process of forecasting supply and demand may involve multiple data inputs from the various markets that the organization serves. In order to understand the total demand for supplies, each distribution centers/warehouse will provide it's own region's supply/demand forecast information. The data inputs are then aggregated to formulate total demand as well as reconciled to ensure information accuracy/quality.

This sub-process involves the aggregation and reconciliation of those forecast information to understand the total demand of supplies. It will be used to plan for production or set the level of ordering quantities, distribution plan, transportation plans, etc.

The sixth sub-process is Generate Optimized Supply Solution 5010.30. This process describes the requirements to establish a supply chain navigator which when developed may be used to create a strategic supply chain plan with scenarios.

The seventh sub-process is Managing Deployment Exceptions 5010.35. While planning for the allocation of supplies (i.e., which locations need supply and how much should be sent), exceptions may arise due to unexpected demand/materials usage, routing issues (e.g., changes to infrastructure, delays due to natural conditions, etc.), or regulatory requirements. As such, the planning of supply replenishment quantities to specific distribution centers/warehouses (i.e., the supply deployment plan) must incorporate fluctuations of demand, routing issues, as well as other unexpected events. This is the objective of the management of deployment exceptions: It is a process where exceptions to the planned supply deployment decisions must be made upon to balance the efficiency and effectiveness of materials/supply distribution.

The eighth sub-process is Transferring Data 5010.40. Prior to generating a forecast using a demand-planning tool (DP/EE), three main steps are required. The first step is to define the necessary background information for the demand-planning tool. Next, the demand history data (actual sales or consumption data preferably) should be loaded from an external system. Finally, it is necessary to use the data transfer application (DTA) to send demand history to the demand-planning tool.

The ninth sub-process is Develop Material Requirements Plan 5010.45. Long term planning is a simulative form of Material Requirements Planning (MRP). The benefits of using long term planning in this way are that the master data and the methods used in the normal MRP procedures are used in the same way in long term planning. Thus the objectives of long term planning can be met with relatively little extra set up effort and training.

Material Requirements planning is intended to offer the means to plan in the short, medium and long term against varying planning scenarios. A production planner may adapt the conditions of these scenarios to explore planning results without affecting the operative (i.e., current) planning situation. Primarily long term planning is used to plan capacity over a long period of time.

In the longer term, results may be useful to develop a long-term purchasing outlook. This forward look can be useful to negotiate long-term delivery schedules and contracts with suppliers. This information is increasingly demanded by suppliers in order to plan their own capacity. The long-term results may also be used in cost center accounting and inventory controlling to plan production costs for work centers, product costs and inventory levels. Therefore it is the concept of long term planning which links material replenishment to the longer-term objectives of cost accounting and inventory level planning.

5020 Procure Supply

The first sub-process is Manage Purchase Requisitions 5020.05. This sub-process describes the requirements to Manage Purchase Requisitions. Purchase requisitions are prepared based on pre-established acquisition triggers (such as required stock levels, or near term schedule needs for an item) and authorized based on established business rules. The requisitions are processed, and based on the rules, become purchase orders releasable to the authorized suppliers.

The second sub-process is Purchase Materials and Services 5020.10. This business practice describes the process of purchasing materials. It discusses the option of conversion of purchase requisitions into purchase orders using a vendor selection process as well as the option of converting planned orders directly into purchase orders, eliminating the purchase requisition step.

Receive Approved Purchase Requisitions: The purchasing process begins with the receipt of purchase requisitions. Ideally, a purchasing department will receive requisitions electronically, but in some instances they are received as multi-copy forms. Requisitions are the authorization to purchase a wide variety of products, goods and services. These requisitions are released prior to receipt by the purchasing agent through an authorization process. Authorization hierarchies maybe based upon value, material group, material type, material class, or even by product line. Hierarchies for approval will differ among industries. Many companies have eliminated the use of purchase requisitions for material used in production or sales. Instead, these companies allow the purchasing department to convert planned orders from material requirements planning (MRP) into purchase orders directly. Companies with manual purchase requisitions use the purchase order as the requisition, so duplication of data is eliminated.

Select Vendor: Once the approved purchase requisitions are received, the vendor from who the materials will be purchased is selected. The purchasing agent will determine the source of supply capable of fulfilling the specified requisition agent will look at whether the material had been purchased before and from whom, as well as look for letters of intent or existing vendor agreements. If no existing vendor is available or the current vendor(s) is unable to meet the requirements of the purchasing agent, a new source is identified. Typically, a new vendor is chosen from a list of already approved sources. For instance; there may be five vendors capable of supplying a part, however, because of quality or delivery problems, three have been blocked from use. Therefore, the purchasing agent can only select from a list of two. The selected vendors are then given the necessary specifications and then provide the buyer with quotations. Traditionally the lowest bid wins. The buyer is responsible for the quality, quantity, and price of all purchased materials and services. Vendor relationships are also managed by the buyer. The buyer typically will obtain quotations for high volume materials to use in future purchases or cost reduction objectives.

Many companies are moving towards alliances that provide mutually beneficial and exclusive partnerships. These partnerships involve sharing of knowledge, improving quality, sharing engineering data, manufacturing processes, and certification, so that materials received are pre-inspected and certified by counting. By utilizing these relationships, material can go right to unrestricted stock from goods receipt. This alliance makes sense for high volume, higher cost materials that may be more difficult to make. It also reduces the number of vendors and improves the quality, price, and delivery of the material.

Generate Purchase Orders: After the source of supply has been selected, the purchase order conditions are negotiated and the material specifications are finalized. Purchase orders are then generated either from a MRP planned order or in reference to purchase requisitions. Finally, the purchase orders are sent to the vendor(s).

Monitor/Control Process: In order to control the purchasing process, the purchasing agent maintains performance measurements for each vendor including: purchase price variance, late deliveries, quality performance, inventory levels, and cost control. Other purchasing control activities include: past due purchase orders (quantity and value), late deliveries, planned vs actual delivery in quantity and monetary value, freight, premium charges for faster delivery, and cost reductions. This data is collected after a purchase order is closed out and may be maintained individually for each vendor.

The purchasing agent has several tools that can be used to assist in the buying cycle: (1) Letter of intent—incentives when quantity or monetary amounts of purchases are met. (2) Blanket orders—orders for large quantities to be delivered over a period (of a year) which may have a predetermined delivery schedule or can be released, as required, by a call from the buyer. (3) Contract—a binding purchase quantity over an agreed period that guarantees the vendor a fixed quantity for a lower fixed price. (4) EDI, FAX—transmitting purchase orders via electronic mail therefore reducing paperwork and lead time. (5) Purchase list—provides a list of items to buy after MRP run that can be sorted by buyer, plant, commodity, due date, vendor, inventory planner, or value. (6) Quotation file—a list of quotations for materials sourced from different vendors for new products used in competitive analysis and future purchases The third sub-process is Manage Vendor Invoices 5020.15. This sub-process describes the steps required for the managing the vendor invoice process. Invoices are received for payment, and are matched (electronically or physically) to the receipt transaction for the authorized items. If all matching rules are met, including validation of acceptance as to quality, the invoices are paid via the accounts payable process.

5030 Manage Shipments

The first sub-process is Managing Distribution Exceptions 5030.05. While planning for the distribution of supplies, exceptions may arise due to unexpected demand/materials usage, routing issues (e.g., changes to infrastructure, delays due to natural conditions, etc.), or regulatory requirements. As such, shipments of planned supplies must incorporate fluctuations of demand, routing issues, as well as other unexpected events. This is the objective of the management of distribution exceptions: It is a process where exceptions to the planned distribution decision must be decided upon to balance the efficiency and effectiveness of materials/supply distribution.

The sub-process begins with a review of all exceptions. Then, they are resolved through a logical approach (e.g., prioritizing exceptions, etc.) and, finally, the transportation and distribution plan optimized and updated.

The second sub-process is Managing Transportation Planning 5030.10. The objective of this sub-process is to maximize a company's transportation resources and capabilities in order to deliver its products to the customer at the lowest possible cost.

Efficient shipment routing and equipment loading across the inbound and outbound distribution network leads to cost-effective use of transportation assets and ensures that customer service level requirements are satisfied. Transportation Planning addresses customer orders, inbound raw materials, equipment transfers, transportation equipment capacity, constraints, and shipping and receiving requirements. The sub-process begins with identifying transportation requirements and service providers and collecting supporting historical data; it leads to a strategic plan that leverages an organization's position to lower transportation costs by negotiating favorable terms and contracts with service providers. This business practice concentrates on the strategic elements of transportation planning.

Figure 4:
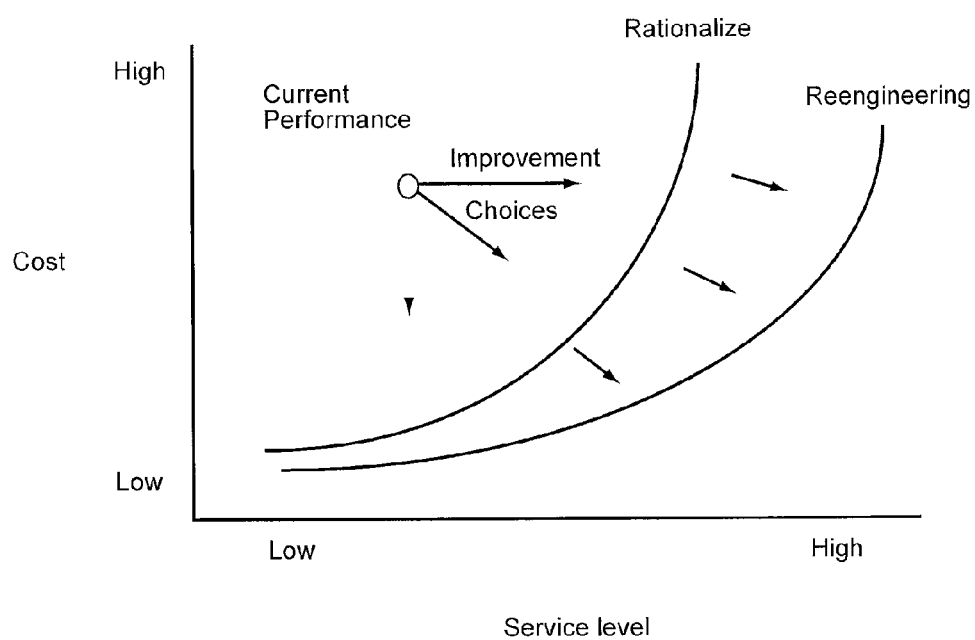
FIG. 4 represents typical performance cost curves.

Optimization requires a company to review its current transportation process. Many companies are rationalizing their transportation strategies to identify opportunities for exponential improvement in both cost and service performance (See FIG. 4). Areas for optimization focus on three areas of transportation planning: mode selection, carrier negotiation, and quality management.

Transportation plans are now oriented in a new direction; they focus on managing the transportation process instead of transactions.

5040 Manage Inventory and Allocation

The first sub-process is Manage Procurement Quality 5040.05. Generally, the process of Quality Management involves planning, executing, verify results, and continuous adjustments to the quality of the materials in the organization. In maintenance operations, this includes the quality of goods received from vendors, parts in-process, and products being delivered to customers. The degree to which quality management is implemented depends greatly on the industry and customer needs. However, with most customers now demanding higher quality of products or services, the need for effective quality assurance is greater than ever before. This is resulting in the implementation of quality initiatives for improving quality at the source. Instead of inspecting quality into materials/products, which was known as Quality Control, industry has is moving toward preventing quality problems from occurring which is referred to as Quality Assurance. A main ingredient in preventing quality problems is strategic partnerships between a company and its suppliers. Companies are reducing the number of their suppliers because of the inherent nature of strategic partnerships and the increased demand on resources resulting from maintaining those relationships.

Even though the last part of the sub-process deals with participating in, monitoring, reviewing, and adjusting of vendor relationships, it affects all the aspects of procurement. At every stage in the procurement process, the monitoring, participating, and adjusting of strategic partnerships occurs. For example, during the design of a product it is typical for a company to consult their strategic suppliers to see if they can provide the specific material according to the company's specifications.

Quality Management processes are often defined by industry standards. For example, ISO 9000 standards, which are widely accepted, define the elements of a quality management system. One company activity where a strong Quality Management program is essential is the Procurement process. Quality Management should play a major role in each step within the procurement process.

Note that there are manufacturers for whom some of the procurement steps do not apply. If this is the case, the practices noted in this document for those inapplicable procurement steps should not be ignored. They can most likely be applied during other applicable steps in the process to achieve the same result.

The second sub-process is Receive and Put Away Materials 5040.10. The objective of Receive and Put Away Materials sub-process is to provide data integrity of material on hand and on order, so that future material planning, commitment to customers and internal consumption requirements can be carried out accurately. These objectives are obtainable in an organized warehouse with accurate recording and tracking of all material.

In order to better plan and control the receipt of materials, the sub-process will reflect the typical business practices of a particular industry. For instance, manufacturing firms that produce medical devices must adhere to the Food and Drug Administrations guidelines on Good Manufacturing Procedures. These procedures directly affect all the aspects of manufacturing ranging from procurement through plant maintenance. The procedures are specific and inform a company on what tasks are to be and how they are to be performed. An example is the need to quarantine rejected raw materials from all other materials.

Many materials can be within the entire Receive and Put Away practice at a particular moment in time. In order to facilitate a means of tracking their flow, it is important that recently received goods are input into the system in an efficient, accurate, and timely manner. There are many consequences if timeliness does not exist within the system and a few are: (1) Creation of rush orders for materials that are already in stock resulting increased cost and over supply of materials. (2) Inaccurate production plan due unknown quantities of materials within the warehouse. (3) Inability to take advantage of payment discounts.

Also, there are many consequences if accuracy does not exist within the system and a few are: (1) Space problems within the warehouse and plant due to over ordering of materials already in inventory. (2) Increase in obsolete materials within the warehouse/plant. (3) Increase in inventory shrink. (4) Chaos in the warehouse causing a duplication of effort in attempting to pick materials.

The third sub-process is Manage Warehouse Operations 5040.15. This sub-process describes several techniques of managing a warehouse, which enable tracking and movement of all materials. It focuses on the methods used for managing goods movements within the warehouse. Some inventory management elements of goods issue to production are also included.

The main purpose of this business sub-process is to aid in the improvement and efficiency of warehouses that use warehouse management mainly through increasing the physical accountability for all materials, increasing the accuracy of goods movements in supplying materials to actual usage and tracking differences between goods requested and goods issued to insure correct delivered quantities.

Excluded are the physical and planning functions of Goods Removal/Picking and Receive and Put Away Materials, which are covered in other processes. Some of these methods may be integrated with automatic warehousing equipment, but describing how this is done is also outside the scope of this business process.

Managing a warehouse characterized by high volume and many materials is a complex task. Some common warehouse performance goals pull the energies of the warehouse in opposite directions, making successful management even more difficult. For instance, the ability to fulfill production and customer demand is usually a primary warehouse goal. This requires having sufficient on-hand materials readily accessible for application to incoming materials requirements. A simultaneous goal is minimizing warehouse inventory. Excess inventory is expensive to manage and store, can reduce cash flow, and impedes warehouse efficiency. It also risks material waste due to obsolescence, damage or loss. Many techniques are available to warehouse managers and personnel to help balance these goals. Like the opposite pull of performance goals, creating a too-complex warehouse management environment will reduce the efficiency gained by the individual techniques. The combination of techniques employed should be chosen carefully, based on its ability to significantly promote achieving the business objectives.

Organize Warehouse Structure: The organization of a warehouse has a direct impact on the placement, transfer, and picking of items. An optimal location of items within a storage area minimizes costs associated with the placement and picking of items. Appropriate placement of materials improves the balancing of high and low material activity, size or specific conditions. Easy access to commonly used material provides improved service levels, reduced cost, reduction of scrap and improved accuracy of counts.

The flow of material through the warehouse is an important factor when considering warehouse organization. Materials, storage areas, typical demand, picking and placement strategies need to be analyzed when determining the warehouse organization setup. For example, it may be desirable to place goods issued to maintenance in a maintenance staging area physically near the beginning of the maintenance process.

The organization and management of warehouses has become imperative for timely, effective processing of logistic requirements within a company. The Warehouse Management (WM) application component provides flexible, automated support to the processing of all goods movements and in maintaining current stock inventories in a warehousing complex.

By organizing a warehouse appropriately it is possible to: (1) Define and manage efficient warehousing structures. (2) Optimize material flow smoothly. (3) Process goods receipts, goods issues and stock transfers quickly and easily.

In the warehouse structure storage areas can be classified as custom-designed, high rack storage, bulk storage, fixed bin storage etc. Different materials can be placed in each storage area depending on their properties. Within a storage type, a storage section is a series of storage bins with the same features. These bins are used for the purpose of stock placements. For stock placements, the following features of storage bins can be important: (1) distance to the turnover point; (2) loading capacity; (3) temperature.

Determine Storage Bins & Bin Characteristics: A record can be created for each individual storage bin, which identifies the warehouse number and storage type in which it is located. Additional characteristics of the storage bin that can be assigned in the storage bin record include: (1) Maximum weight. (2) Total capacity. (3) Fire containment section. (4) Storage bin type for example for small or large pallets.

Assigning these characteristics is useful to the material handlers so that they can quickly identify where a specified bin is physically located. When defining storage bins, the number of bin types should be limited to those that add value for the business. For more information about designing a warehouse structure refer to Solution: Define Warehouse Hierarchy.

Classify Materials using ABC Analysis: ABC classification is a system used to determine the importance of materials, and thus the type of control needed. This is based on the principle that relatively few items often dominate the results in any situation. It is common for approximately 20% of inventory items to use 80% of warehouse management expenses. Similarly, 30% of the items require 15% of the expenses, and the remaining 50% require only 5% of management budget. Therefore, determining the correct classification of materials can help focus these Warehouse Management expenses to achieve the greatest results.

One way to calculate ABC rank of a list of materials is to determine their annual number of units multiplied by unit cost. The result of this calculation is the "total annual dollar usage" of each item. The items are then ranked in order of dollar usage percentage of annual sales. The top 20% of dollar-users would be ranked as class "A," and so on.

"A" items are high priority. They need complete and accurate record keeping, frequent management review, frequent review of demand forecasts, etc.

Setting ABC classifications is a prerequisite for cycle counting, and affects counting frequency. Bins storing "A" materials should be counted more often than bins storing "B" materials. The rating may also suggest physical placement of items in the warehouse. The most frequently used items should be stored in the most accessible storage areas. "A" items get preferential placement at the ends of aisles, near production, or at human-reach level.

Select Source and Destination Bins: By using stock placement Strategy the Warehouse Management System automatically searches for a suitable storage bin in the warehouse for placing goods into storage. As a rule, you define a certain stock placement strategy for each storage type (for example, search for the next empty bin) in order to optimize stock keeping and the material flow within the warehouse.

Stock removal in the WM system refers not only to the picking of goods for deliveries or for production purposes, but also to the removal of materials from a storage bin (or storage type) in the warehouse for any reason. To facilitate the search for materials in the warehouse, it is possible to use stock removal (picking) strategies available in the WM system.

When moving goods, the movement order can specify to the operator the exact source and destination bins. This takes away the operator's guesswork thus picking/placing speed and accuracy increase, improving warehouse efficiency. Great control over managing inventory can be gained by knowing the status of all bins in the warehouse, type, location, capacity, current contents, current available space, material allowed in bin, whether or not the bin contains pallets. It requires rigorous record keeping of all bin characteristics and goods movements to maintain this system.

A smart system will be able to easily locate any material in a warehouse, even if it is stored in multiple scattered locations. It will also identify empty bins which can accept storage of goods received. Depending on the system chosen, it may be possible to manage goods placement dynamically instead of on a dedicated bin basis. Dedicated (fixed) bin placement requires material to be placed in a pre-defined bin or set of bins. Randomized (dynamic) placement allows the material to be placed in any appropriate open bin in the warehouse. Randomized placement reduces overall space usage and alleviates problems related to over-crowded fixed bin space. It helps balance goods in the warehouse for better access and may improve traffic flow. It also accommodates fluctuations in the types of materials stored with less physical reorganization of the warehouse due to demand changes.

Receive Materials: Warehouse personnel should begin tracking the material flow via a reference number immediately upon receipt. They should count and verify material quantity and reconcile differences for more accurate material planning. Accurate material receipts lead to accurate inventory counts and open order balances.

Check Quality: Some materials may require quality inspection upon receipt and before storage. A batch of material may be placed in a restricted or blocked status until this quality inspection is completed. Quality data can then be recorded, usage decisions made, and the appropriate material movement made.

Evaluating and establishing procedures ensures the condition and quality of incoming materials, work-in-process, and finished products. This includes adhering to quality standards, material specifications, company policies, and regulations. For more information about Receiving Materials into the Warehouse refer to Receive and Put Away Materials.

Count & Move Materials, Update Bin Data

Controlling Inventory at Bin Level: It is useful to view and control all warehouse materials by "bins." A bin is defined as the smallest area used for addressing and tracking inventory. Some examples of "bins" include: a) a box on a shelf for holding a material, b) a small storeroom which is easily managed by one knowledgeable person, c) an area holding one or more pallets of material. A bin may be reserved for only a single type of material, or can store different materials in sequence, or composite bundles of related materials. For instance a bin may always store nails, or the bin may store nails today and screws tomorrow, or it may always store small packets of 6 nails and 4 screws.

Detailed bin knowledge may be used for some advanced management techniques such as forecast-based space management. For example, there may exist an outstanding order of a large amount of material that requires use of certain storage bins. Recognizing this a week ahead of time enables warehouse personnel to shift materials around during slow times and create space for the large shipment. Lack of this knowledge might create a large backup of materials waiting in the goods receipt area. This situation might block traffic or delay supply of goods to areas of need.

Empty Bin Inventory and Cycle Counting at Bin Level: Bin control can also be useful for maintaining continuous knowledge of current inventory. Again, this requires disciplined record keeping of expected bin contents. Every time a material movement is expected to empty a bin, the operator should verify that the bin is actually emptied. If material remains, this fact identifies an inconsistency of inventory knowledge. The operator would record the amount of material remaining, thus continually improving knowledge of current inventory. This technique is especially useful when employing an inventory cycle-counting strategy. In brief, cycle counting replaces a mass shutdown for yearly total stock counting. Instead, each material type is counted periodically throughout the year, depending on its usage and value. High turnover or critical raw materials might be counted monthly, while maintenance materials might be counted yearly. With bin control at work, each bin can be cycle counted. Every time the bin is verified as empty its inventory count is considered complete and the bin will not require counting again until the standard period expires. In this way, inventory is actually taken more often with less impact and more precision.

Prioritize & Monitor Demands: The warehouse is inundated by demands from many directions—sales and distribution, production, internal needs, maintenance schedules. Critical to smooth operation is the ability to prioritize and monitor these demands to ensure they are visible and completed in a timely manner.

Evaluate demand load using a request document. The Request document represents the basic warehouse unit of work. Each should contain a completion date provided by the requester. It may also be helpful to track a earliest-need date as well or institute standard maximum lead times based on the function. For example, if production needs materials by 3:00 PM Friday, the standard may dictate delivering them by that time but no earlier than 2 hours before.

Ship Goods Based on Demand: A warehouse may include the shipping department, but often a Sales and Distribution department manages shipping of goods. In either case, the warehouse will need to contribute some basic data about the materials provided. The warehouse may provide a list of the type and quantity of material in the shipment, serial numbers, expiration dates, and handling instructions. Much of this data is used to generate the Bill of Lading. Data should also include a reference to the original request (such as a sales order) so that the correct delivery information will be associated with the package. Order verification is usually part of the loading process. The warehouse would provide a high-level checklist of the order contents picked for comparison with the sales order. It is important to be aware of any data that the warehouse should store for auxiliary purposes such as creating shipping documents.

Additionally, sales and distribution data can be used to help increase the efficiency of the warehouse. Knowledge of dock schedules and other logistical data may be used to determine the timing and physical destination of shipping material movements. The warehouse will need to know at which of several docks to drop the delivery, the intended carrier, whether to drop materials in a shipping staging area or put directly in a truck, etc.

Take Action Based on Information: If large shipments are expected to come, the warehouse personnel must make room before the goods arrived at the warehouse location. Establish a rigorous method for executing, tracking, and statusing all goods movements. This can be done by using movement request documents (henceforth called "Requests"). The initial movement request document specifies the types and quantities of goods to be moved. Ultimately, the Request should also specify the source bin and destination bin. Typically, a Request is printed to serve as a movement tag, or fed to an automated movement device. When used this way it actually causes the movement to occur. In many implementations, the document is stored as an electronic record. Successful completion of any movement should be recorded with a Request ID to update inventory quantity and location statuses. Warehouse personnel should be allowed to cancel the movement portion of the Request prevent immediate movement), while retaining knowledge of the still-existing material need. The initial Request itself may be canceled with authorization.

The "request queue" or ordered list of Requests must be prioritized based on timing and business needs. At any time, managers should be able to view time-ordered reports of requests, anticipate volume of work, notice unusual shipments, identify bottlenecks, etc. These abilities provide a lot of leverage for proactively managing workflow, floor space, and personnel scheduling.

Generate Reports: A set of reports summarizing warehouse data assists in improving a variety of decisions. Reporting may be done manually, but sheer data volume and accuracy requirements usually imply creation of reports by scanning electronically stored warehouse data. Those designing the warehouse management system should take into account the set of reports needed, and determine reliable ways of gathering, storing, and retrieving key data.

A basic set of reports simply provides various ways of viewing the contents of the warehouse. Some basic report examples: (1) List all locations and current quantities of material X. (2) List contents of any storage area (a rack, an automatic storage machine, etc.). (3) List of empty bins/pallets meeting specified storage characteristics such as size, temperature, fast-moving vs. slow-moving. (4) List of partially filled bins or pallets. (5) List of materials in order of goods receipt or expiration dates. (6) Show inventory turnover rates.

The fourth sub-process is Count Inventory 5040.20. The annual physical inventory counting is a sub-process that attempts to maintain the accuracy of the book to actual inventory quantities. Physical inventories are required to ensure that the inventory quantities and values on the system are accurate. While many companies in the past have relied on taking inventory once a year, the preferred method for counting inventory is taking cycle counts throughout the year. This method goes hand in hand with conducting ad-hoc counts, which are initiated by the user when some sort of discrepancy in item quantity is discovered. An ad-hoc count is a user-initiated count for a specific item and storage location. It can occur at any time for any item. The ad-hoc count normally results from count discrepancies found during one of the store operations. Ad-hoc counts are not planned in advance, thus materials to be counted would be manually selected.

Counting inventory is an important activity and carried out for the following reasons: (1) To identify differences between physical and stock on hand figures in the system. (2) To identify stock differences and update the stock in the system. (3) To investigate differences and close any gaps in other operational processes that cause the shrinkage. (4) To notify the relevant managers of their shrinkage figures and to highlight various problem areas within the various material categories. (5) To have a process that is carried out on a regular basis (to avoid distortion in the other operations).

Basic counting procedures include the use of:

Blind Counting—Counts are made without awareness of the theoretical stock amount.

Duplicate teams—each count is carried out by two (or more) teams operating independently. When completed counts are compared, discrepancies are reconciled, and agreed on.

Identify Variances—After a count is made, variances outside agreed tolerances are investigated, and reconciled. Differences that cannot be accounted for are then recorded in a variance account determined by accounting, after an approval process.

Classify Materials on ABC Basis: ABC classification is one of the most widely spread forms of classification used by manufacturers. It allows companies to treat materials differently according to their characteristics. ABC classification groups materials into various counting categories and is the vehicle used to determine how often a material should be counted according to its consumption value, perishability, volume, and vendor lead time. Usually these categories correspond to the ABC analysis of materials but can also be defined by the user. ABC classification works as a pre-step to cycle counting (a method of monitoring physical inventory at regular intervals within a physical year). These intervals/ cycles depend on the physical inventory indicator for cycle counting which is set in the material master storage 1 view. ABC classification can also be used for other purposes, such as determining stock location or batch selection, but is most commonly utilized for physical inventory purposes.

Count Inventory: Cycle Count: This practice outlines the process for completing a cycle count and posting the inventory. Cycle counting is a method of physical inventory where inventory is counted at regular intervals within a fiscal year. The cycle intervals are based on the ABC analysis which categorizes all materials as either A (fast moving/high value), B (normal movement/average value), C (slow moving/low value). This system allows fast-moving/high value items to be counted more frequently than slow-moving/low value items. The cycle count is based on a Physical Inventory Document (PID). The PID lists which materials are to be covered by the count. A default PID is generated for each count based on the ABC Classifications of the materials. The PID can be amended and saved for re-use at later counts. On completion of the count the book inventory value is compared to the actual quantity, as stored in the system. Any discrepancies are identified. The data recorded by the physical count can be amended or the differences can be posted.

Count Inventory Take Full Physical Count: This practice outlines the process for completing a periodic count and posting the inventory. The Physical Inventory Document (PID) lists which materials are to be covered by the count. The periodic inventory process is very similar to the process for the cycle count, with the major difference being the selection of the materials to be counted. The periodic inventory system is often used by warehouse personnel when dealing with slow moving materials (materials with low turnover rates). While cycle counts are done at regular intervals throughout the year, the periodic inventory is done annually, with every material being counted. During counting, the entire warehouse is blocked for material movements. On completion of the count, the actual inventory is compared to the book inventory as stored in the system, and any discrepancies are identified. The data recorded by the physical inventory can be amended or the differences can be posted.

The fifth sub-process is Manage Inventory Valuation 5040.25. The sub-process of managing inventory valuation involves monitoring the cost of inventory as it moves through various stages of the value-added process (e.g., manufacturing, fabrication, assembly, reformation, etc.) from raw material to finished goods. As materials are received into a company, warehouse and inventory control personnel account for the number and monetary value of the materials received. The number and price of the materials are then entered into a company's system for tracking and further evaluation. A company's accounting department becomes involved in the inventory valuation management sub-process in several ways. In addition to having access to the inventory counts and costs, an accounting department's involvement in inventory valuation management may include some of the following: working with inventory and warehouse personnel to agree on how much inventory is cost-efficient to have in stock at any given time, creating formulas to calculate the value of a material as it moves through the stages of the value-added process, participating in taking physical inventory counts along with inventory and warehouse personnel to ensure that stock amounts are accurately reported. It is necessary that companies follow good inventory control procedures. To achieve this, the accounting department should work closely with other departments to determine inventory control policies. This often can be difficult since sales and production departments usually want as much inventory as possible at hand so that many types of orders can be filled more quickly. At the same time, the accounting department usually wants to keep inventory low in an effort to keep costs down, the rationale being that a closely-controlled inventory frees up cash for other company uses. Ultimately, these two sides need to agree on the most financially beneficial inventory management approach for the company to take.

Record Physical Inventory Transactions: As material moves into and out of a company, it must be accounted for on volume and cost bases. At the time that materials arrive into the company, warehouse personnel account for the number of items brought into stock and then determine which items will be valued at a standard or variable moving price. A standard price is a fixed price at which an item is valued when it arrives at the company. For example, a company may purchase 100 widgets at the cost of $12.00 per widget. The company decides that the widgets only have a value of $10.00 to the company, and therefore this value is re-assigned to the widgets. A company may determine that the standard price of a product is to be higher, lower, or the same value that was paid for it. Should a company decide to price incoming items at a variable price, then the price of the item fluctuates up or down depending on the actual cost of subsequent purchases of the same item. For example, if a company purchases 100 widgets at the cost of $10.00 apiece, and the next order of the same type of 100 widgets cost $20.00 apiece, then all 200 widgets are valued at $15.00 apiece.

As material is received into a company, several other inventory (and, in turn, accounting) decisions must be made. Companies who are committed to closely controlling their inventory will use tracking systems to keep watch over their materials. One of the more typical means of categorizing and accounting for inventory is through ABC analysis. Items labeled as "A" items are high-movers, "B" items do not move as quickly, and "C" items are slow-movers. Determining which items are A, B, or C movers is done through historical data usually taken over a one-to-three year period of time.

Many companies will periodically conduct counts of their inventory, known as cycle counts. Cycle counts can take place in addition to a fiscal year-end inventory count, and can occur at any point during the fiscal year—quarterly, monthly, etc. Often, different items in inventory have different cycle counts, with fast-moving items counted more frequently than slow movers. This can help at fiscal year-end inventory time in that discovering inventory inconsistencies early on can help eliminate problems during fiscal year-end inventory. Since lost inventory is lost money (and too much inventory means that money has been spent which reduces cash flow), discovering inventory problems during cycle counts can help reduce the number of lost dollars at year-end.

One of the ways that some companies attempt to control inventory and regulate cash flow through a process called Economic Order Quantity (EOQ). This is a method or ordering stock in a way that minimizes the costs of acquiring and carrying inventory. The formula for determining the quantity of material to order is:

$$\text{Quantity} = \text{square of}(2 \times \text{annual demand} \times \text{average cost of order preparation/annual inventory carrying cost percentage} \times \text{unit cost}).$$

Other companies subscribe to an inventory control policy known as just-in-time manufacturing (JIT). This type of operating environment is designed to minimize the volume of inventory carried by a company at any given time. Carrying minimal inventory, in turn, theoretically maximizes productivity and minimizes the cost of inventory carried. With JIT, a company keeps on hand only the required inventory necessary to produce their goods. These companies must work closely with their vendors and customers to coordinate inventory delivery of the raw materials and shipping of the finished product. Ultimately, the necessary materials arrive (or are produced) "just-in-time" to be used or sold. Ultimately, since materials are not either waiting to be put into production, or waiting to be shipped, the cost of carrying inventory is greatly reduced. However, as with any inventory control method, JIT can only be successful if it is supported by other solid management policies and procedures.

Maintain and Update Inventory Value: The value of inventory is affected by several factors after it is brought into a company: general overhead, contract negotiations, general cost of labor, cost of benefits, etc. As inventory moves through the production process and moves closer to becoming a finished good, its value increases. If inventory remains on the shelves and is not put to productive use within sufficient time to recuperate the money spent for that material and the labor put into the final product, this can put a strain on a company's cash flow.

After the incoming material has been categorized and valuated upon entry into the company, each piece of material is then grouped into an account where its value will be tracked by the accounting department as it moves through production or remains in stock. For example, raw material may be in Account 1 and a grouping of four similar component types are categorized into Account 2, and so on. Formulas will have been set up to calculate the cost and value of each piece.

After material has been received into a company, a standard or variable price is assigned to it. Often the date when material was received into inventory can affect its value. Usually, companies use the LIFO/FIFO system as one way of determining the cost of an inventoried item. LIFO/FIFO refers to "Last-in-first-out" and "First-in-first-out" respectively. The last item that has been purchased is usually the most expensive whereas the first item inventoried was purchased at a lower cost. For example, a company purchases forty cases of widgets at the cost of $100 per case in March. Another forty cases of the same type of widgets cost $120 per case in April, and a third set of forty cases of widgets costs $140 per case in May. For the next production order requiring the use of this type of widget, the company will want to use the widgets last purchased ($140 per case in May) since they were the most expensive. While most materials probably will not surge in price so quickly, there are many materials whose markets are more prone to fluctuations, for example, oil, gasoline, grains, etc., the prices of which frequently change by the barrel or bushel. The FIFO system may be applied to other types of materials that have a short shelf life.

The value of inventory changes further as it goes through production. The value of the material increases throughout the development process from raw material to finished good. Material has one value as raw material, and then this value changes as the material passes through various development stages to become the final product. At each subsequent staging area, the value of the material will change as more time, labor, and components are added to the original raw piece.

In order to re-calculate the value of material as it moves through the production process, many companies have an automated system that records a material's movement through production. This is known as automatic identification (AI). Computer-related equipment can read, record, and respond to tracking symbols on inventoried material. Tracking symbols may include printed symbols and bar codes. Materials labeled with bar codes can be easily tracked as they move from the raw material stage to work-in-process (WIP) stage, and ultimately to finished good stage. This type of system can help a company re-valuate material as it goes through each stage of the production process. It will be necessary for a company to re-valuate materials during the production process in order to see how much inventory is being utilized. The closer materials come to being part of the final product, the more value the materials gain. In general, an AI system can assist both inventory control and accounting personnel account for stock volume and value through computer-linked tracking systems.

A company will want to move their inventory out as quickly as possible. No matter what stage inventory stock is at—raw material, WIP, or finished good—the longer it stays around, the less cost-efficient it is for a company. Therefore, all departments need to work together to account for and move inventory as quickly and efficiently as possible.

Monitor Inventory Status/Performance: A cycle count needs to be performed in order to keep both inventory control and accounting personnel aware of the state of inventory stock. Performing cycle counts throughout the year helps a company to catch potential problems prior to the end of the fiscal year. In addition to cycle counts, a full inventory should be taken at fiscal year-end for reporting purposes. At this time, the accounting department will need to calculate the cost of goods sold, and the cost of the inventory that has been lost or gained throughout the fiscal year. Formulas for calculating these costs vary by company. Once the costs, gains and losses have been calculated, a report is generated reflecting the totals for the fiscal year. It is at this point when companies need to re-evaluate their inventory control and cost accounting procedures. While cycle counting cannot guarantee inventory accuracy, it can help identify inventory control problems early on. As with any inventory control approach, cycle counting can only be effective when used in conjunction with solid management policies and procedures.

The sixth sub-process is Manage Inventory Reports 5040.30. Inventory management reports provide the ability to increase inventory turnover, provide timely information, and improve inventory planning. This sub-process involves the identification, creation, and generation of those reports that are required for inventory management and performance measurement.

The seventh sub-process is Manage Environment Safety and Health 5040.35. The objective of this sub-process is to provide employees a workplace free from danger, risk, or injury, and to avoid environmental hazard conditions. Additionally, it is intended to ensure that the organization complies with all laws and regulations as they relate health and safety.

The eighth sub-process is Manage Inventory Transfers 5040.40. Inventory transfers include the planning, data entry, and documentation of all goods movements to, from, and within the storage locations in the warehouses used by the company. A goods movement (also called a material movement or stock movement) is an event that causes a change in stock. The ability of a company to identify movement requirements will allow materials to be moved accurately and efficiently. Depending on how the company is organized or on the sales and distribution policy used, goods movements may involve more than the receipt and issue of goods. Goods movements may be used to: (1) Balance inventory quantities in multiple storage facilities. (2) Efficiently distribute goods needed on an emergency basis. (3) Consolidate storage bins. (4) Scrap materials due to obsolescence or reclassify them for other uses.

Identify Inventory Movement Requirements: The requirement to move a material can be internally generated (e.g., consumables), or generated by externally sourced requirements (e.g., finished goods or service items). The planning of anticipated inventory movements can be affected by using reservations identifying the material that has been allocated to a particular customer or production order. Reserved quantifies affect the availability of stock for other activities with the company. For example, if stock is reserved for consumption for maintenance it is no longer available for use for other company activities—e.g., sales orders. Warehouse personnel use these reservations to plan goods movements for specific dates to ensure that the reserved amount of material is available when needed. The warehouse manager may need to prioritize inventory movement requirements to ensure that all movements occur in a timely fashion, see—Manage Warehouse Operations.

Determine Method of Movement: Inventory movements can occur for a specific quantity of material. The method by which the material is moved, may depend upon the distance of the movement, the transportation to be used, and the value of the material to be moved. Cost, efficiency, accuracy and information available during the movement may be directly impacted by all these factors. For example, a company may make personal computers. These are relatively expensive and fragile pieces of equipment. Because they are expensive items, the shipping party may wish to keep track of the shipment of these computers between it's storage facilities. In addition, these computers may be expensive to ship, thus the may want to assign these costs evenly over the stock value of the items shipped as well as have the receiving party (bill-to-party) billed for the costs of shipping. Finally, the receiving party may keep inventory low and require just-in-time (JIT) shipment of these computers, requiring the shipping party to use faster modes of transportation.

When determining the method of movement, it may also be necessary to determine the type of movement. This material can be moved from one storage location to another storage location and this may occur within a single plant or between two plants. Also, it can be designated for a specific purpose without being physically moved. For instance, a computer may be blocked for shipment to a customer because it must first need to be quality inspected. Thus, the goods movement in this case was from available for sale stock to quality inspection stock. Finally, it can be moved and designated.

Execute Inventory Movement: Once the appropriate documentation has been completed the inventory movements can take place. Depending on the complexity of the warehouse environments and the picking strategy chosen previously, the inventory selected for movement will be removed from storage (e.g., physical inventory movement from plant to plant). If the movement involves inventory of significant value or occurs over large distances, it may be necessary to monitor the movement to ensure its delivery and receipt. A goods issue will be posted. Once the inventory reaches its final destination warehouse personnel will receive the inventory and place it into its proper storage location using the appropriate putaway strategy.

Financial accounting implications can result from inventory movements. Whether or not accounting documents are produced will depend on whether the inventory has crossed defined valuation areas. As a result, if the movement took place between distinct accounting entities, billing may need to be initiated to ensure delivery costs are assigned to the goods being moved. The invoice (billing document) may need to be verified to ensure that stock values where increased and decreased appropriately. For example, a company may look at the good issue, goods receipt, and invoice, to ensure the quantity and value of stock match (a process commonly referred to as three-way matching). In addition, if any goods were damaged in the process, this would also need to be reflected in these documents.

5050 Dispose Obsolete Supply

This process includes one sub-process—Perform Disposal of Assets 5050.05. This sub-process describes the work steps for Performing Disposal of Assets. This includes documenting the disposal or transfer of assets and accounting for the loss of the value of those assets in inventory, as well as any revenue generated by sale of the assets if it is not scrapped.

5060 Manage Suppliers

The first sub-process is Manage Vendor Performance 5060.05. Managing supplier relationships is the sub-process of developing and maintaining good working relationships with select, qualified suppliers. The goal of these relationships is to ensure that the right materials and services are purchased from the right supplier and delivered at the right time.

The second sub-process is Manage Vendor Data 5060.10. Manage Vendor Data pertains to the Maintenance of group supplier data in a central location. This data repository should be accessible from all units of the company and should support business processes reliant upon supplier data, such as the purchasing and invoice payment functions.

Effective supply chain management is increasingly becoming a major source of competitive advantage. Maintaining accurate supplier information should improve purchasing and accounting operations. For instance, maintaining central records of all vendors used by the company enables the aggregation of demand from any one supplier across all operational units within the company. The aggregation of demand would give a central purchasing group increased power when negotiating purchasing terms and conditions (i.e., prices, discounts and schedules).

In addition to the improved purchasing power gained by aggregating the purchasing function, having a central purchasing agency will facilitate the planning of purchasing, the rationalization of suppliers and the integrity of supplier information. Well-defined supplier information enables a global purchasing group to operate. Thus, a central purchasing authority would have a vested interest in maintaining accurate supplier data. Although holding information centrally is a key concept of this best practice, it is not mandatory to have a central purchasing authority if a group's operational units purchase different materials to each other. In this case a more decentralized purchasing organizational structure would be more effective. The data storage should still remain central.

The third sub-process is Manage Vendor Agreements 5060.15. This sub-process meets the objective to evaluate, negotiate and implement agreements with vendors that deliver the highest net margins. These agreements include detailed consideration not only of discounts/rebates awarded to the company but of other factors that are part of the net profit margin, i.e., shipping, storage etc.

Environment/Characteristics: The process of managing vendor agreements is conditioned by the kind of relationship that a buyer may have with any given vendor. This relationship can range from a traditional one (where the buyer is concerned only with getting the best price and conditions for the exchange) to a more interdependent, cooperative one (where buyer and seller work together, considering more aspects of the contract, i.e., shipping/storage costs, sales forecasts/targets etc.).

Payment terms are arrangements with the vendor that are often overlooked. Arrangements are a way to get the buyer to pay immediately, for example, the sooner the vendor receives payment the better discount the buyer will get. The vendor actually ends up losing money but they receive payment promptly. Agreements with vendors are normally made for certain time periods and therefore specify beginning and ending dates.

Challenges: (1) To move from an ad-hoc, deal driven agreement negotiation process to a more long-term, strategic focus with net profit margins in mind. (2) To move away from complex deal structures with high administrative overhead to simpler deals which require less hours to maintain. (3) To accurately and thoroughly weigh the costs associated with the agreement against the profits expected as a result of the agreement. (4) To reduce the number of vendors. (5) To eliminate duplicate tooling charges in the production process that can occur when raw material is supplied from multiple vendors.

Business Practice Description: Vendor agreements are longer-term arrangements between a company's purchasing organization and a vendor regarding the supply of materials or the performance of services within a certain period according to predefined terms and conditions. These agreements may be referred to by a number of terms including "blanket," "master," "framework" or "umbrella" agreements.

The terms and conditions on which a vendor agreement is based include financial terms, delivery/replenishment details, and dates of applicability.

Financial terms include: (1) Invoice unit price. (2) Associated additional costs i.e., distribution terms. (3) Discounts (volume, value, timing based, performance based). (4) Payment timing. (5) Payment methods (Electronic Data Interchange (EDI), Direct Payment (DP) etc.).

Delivery/replenishment details include: (1) Pack sizes. (2) Delivery quantities. (3) Delivery points. (4) Lead times. (5) Return policy. (6) Service levels/targets (i.e., delivery accuracy). (7) Exception handling if targets not met. (8) Deadlines (i.e., how many weeks prior to a change must the dealer be notified).

Vendor agreements are used to provide vendor incentives for doing business with the company in expectation of high performance. The company identifies the type of agreement that is best suited for a vendor and material. Through discussions, common objectives are defined. Vendor agreements define a target quantity or value for a period of time. These agreements are reevaluated near the end of the validity period to determine if the agreement can be extended, revised, or whether the vendor needs to be replaced. A vendor must be able to meet both the expectations and requirements of the purchasing company. Vendor evaluations are carried out to determine future purchases and conditions.

6000 Product Development

The first layer of the MRO framework includes a sixth business area, Develop Products, Processes and Capabilities 6000, also referred to as Product Development. Under this business area, in the second layer, the framework includes five business processes: Assess Required Capabilities 6010, Conduct Research 6020, Design Products and Processes 6030, Produce Products 6040, and Acquire/Dispose Capability 6050. Each of these processes includes a number of sub-processes in the third layer of the framework.

6010 Assess Required Capabilities

The first sub-process is Determine Level of Competence for All Installed/Planned Processes (Cpk) 6010.05. This sub-process involves determining if the schedule turnaround time is accurate and valid, such as by measuring the amount of actual versus estimated time to complete a specific production cycle. The measurement of CpK (a statistically calculated number per standard formula) provides a measure of the capability of the process being measured to provide quality output at a level acceptable to the product user. Hurdle levels of CpK are established to enforce required quality levels, such as 6 sigma quality.

The second sub-process is Determine Additional Processes Required to Meet Existing and Forecast Market Demand 6010.10. This sub-process includes the identification of additional processes based on existing or future anticipated demand. These sub-processes may include required steps based on additional volume and/or changes in product specifications. Additionally, this may include re-tooling of the facility or the addition of temporary facilities or capacities.

The third sub-process is Verify Against and Update Capacity Plans 6010.15. This sub-process includes the identification of additional processes based on existing or future anticipated demand. These sub-processes may include required steps based on additional volume and/or changes in product specifications. Additionally, this may include re-tooling of the facility or the addition of temporary facilities or capacities.

6020 Conduct Research

Conduct Research includes one sub-process, which is Evaluate State of the Market Processes and Alternates 6020.05. This sub-process includes the development of research topics and information to provide the organization with the most updated and current processes for M&E product development. This will include extensive market analysis, strong knowledge collection and processes for continuous improvement.

6030 Design Products and Processes

The first sub-process is Design Products 6030.05. Product Configuration should be considered in order to alleviate confusion of product complexity. At the point of quotation or sales order entry, only relevant questions regarding product options require input.

Environment/Characteristics: Product Configuration significantly reduces the number of distinct BOMs listed in a system, since BOMs can be organized by classes and product variations can be produced from them. One BOM covers the spectrum of all possible configs.

The ability of companies to customize, or configure, a product based on customer demands is a requirement in the highly competitive market of today.

Customers demand the ability to custom order many products driving companies to a production pull strategy (assemble-to-order) as opposed to more traditional push strategy (make-to-stock).

An example is customer or country specific requirements such as labels or language specific instructions.

Challenges: Communication between product Engineers and the Sales departments can be difficult to coordinate in a time that is acceptable by the customer.

Marketing is not always able to communicate to the consumer all of the available products.

The process of servicing the customer is hindered by an internal lack of understanding of the products offered.

The time required to attain the expert level in the sales order entry process is too long. Sales order entry clerks are not always aware of the latest product offerings. Pricing can be dependent on the configurable product and on the customer who is ordering the product.

The lead-time on products that are configurable (assemble-to-order) is typically longer than make-to-stock items.

Business Practice Description: Product configuration refers to configuring a base product to meet customer requirements as opposed to creating a new unique product for each customized order. The ability of companies to customize, or configure, a product based on customer demands is a requirement in the competitive market of today. Customer's demand the ability to custom order many products driving companies to a production pull strategy (assemble-to-order) as opposed to more traditional push strategy (make-to-stock). In order to stay competitive, companies must accommodate demands and should also consider the implications to many of their processes, including: sales, order entry, engineering, materials planning, manufacturing, service, and the system which is intended to handle this integration.

Receive Request for Quotation: In this step, a customer can inquire about prices and options, which can accompany a particular product. An example of product configuration occurs during the ordering of an automobile. The customer may be attracted to a base model vehicle, but at the time of purchase he or she requests certain options to be added to the base model of the new vehicle: black leather seats, CD player, etc. All of these options are simply additions, or configurations, to a base model vehicle.

Multiple levels of this configuration can exist. An attachment, such as a radio, may be configurable, but questions regarding the configuration of the radio need not be asked unless the radio option has been selected as a higher-level option. A dynamic price list should also be available at this time, often for a "what if" analysis for the customer to assess the possibility of purchasing additional options.

Enter Sales Order: At the point of sales order entry, not all options which are listed on the generic BOM can be addressed. For example, the manufacturer may not offer an optional amplifier unless the CD player has been ordered. In this case, the sales order clerk should not be concerned with questions regarding the amplifier if the CD player is not ordered. In this example, the amplifier and the CD player have a dependency; the inclusion of the amplifier on the final production order is dependent on the inclusion of the CD player. Engineers can build in their product expertise, enabling the product configurator with their intelligence, to make rule based decisions such as: (1) Exclusion: an item is excluded from the order based on other selections. (2) Preconditions: an item selected depending on a previously selected item. (3) Action: an action is performed, such as price calculation or material quantity adjustment, depending on the selection of an item. (4) Mandatory/Optional: items are either included each time or as on option to the BOM.

If a customer orders a material with configuration options, sales offers the customer a pre-defined set of choices. Once the preferences are captured, manufacturing and order fulfillment can be completed since all valid combinations of the BOM have been defined. If a customer orders a base model, the order can go directly to Production since there are no options available to a base model. Production produces the vehicle, relieving the items that are reflected on the BOM from the inventory, and the vehicle is delivered to the customer.

An integrated Product configurator will allow the Sales order entry clerk to be educated about the latest product offerings based on the knowledge in the system from Engineering, Marketing, and Pricing. (The software packages that support product configuration are referred to as configurators.) The configurator will allow the sales order entry clerk and the customer to perform a "what if" scenario for option pricing enabling the customer to establish a best value assessment. An availability check can be performed at the time of order entry in order to provide the customer with accurate information.

Develop Configurable Product: During product development, product engineering must work closely with purchasing and production to determine which components and subassemblies should be produced in-house and which should be externally procured. In general, companies should concentrate their in-house production efforts on their core competencies, and outsource all other materials. The Bill of Material (BOM), which is a list of the components that make up a semi-finished or finished product, specifies whether an item is to be produced in-house or externally procured.

A material can have a single-level or multi-level BOM, depending on its complexity. A single-level BOM is one where the components cannot be configured. As a result, the product of a single-level BOM is not a component of another material. In a multi-level BOM, there are materials that are both components of higher-level materials, and products of lower level materials. Multiple-level BOMs are used in material requirements planning (MRP) to determine dependent requirements for components. This process is called the BOM explosion.

Together, the BOM and routing can be thought of as the "building blocks" of a manufacturing enterprise. The routing outlines the work centers and operations required to manufacture the product. During production, the BOM and routings are used together to form a complete picture describing how the product is assembled and what components make up the product. They are used to determine if customer demands can be met, and are used to document the production processes that define the business. Accurate BOMs and routings enable a company to successfully track its costs and processes. In addition, accurate BOMs and routings allow a company to improve its existing products and production processes which will result in long-term profitability.

To handle product configuration the BOM can be updated to contain the base model, a mandatory option, as well as all of the optional selections. When the customer requests to have the leather seats and CD player the sales person places the order to the manufacturer indicating that the base model vehicle is to be built with the base model radio being replaced with the CD player, and the bench seats being replaced with bucket seats covered in black leather. The original BOM has all parts listed including the base radio, CD player, bench seat and bucket seats. After the sales order is entered the production facility should receive a production order that refers to a production BOM. This BOM should list the base model vehicle with the CD player and bucket seats, with the base radio and bench seats. By entering a BOM generically, and allowing all of the possible options, the system will contain only one BOM for each vehicle model and variations can be made from it. Product configuration will significantly reduce the number of distinct BOMB listed in a system, since BOMB can be organized by classes and product variations can be produced from them.

Run MPS/MRP: The production plan, forecast, available and planned inventory, inventory policy, and rough cut capacity planning are all inputs to the Master Production Schedule (MPS). The production plan provides information that capacity is available to produce the sales plan. Master scheduling has to arrange the products to be made into a logical and carefully planned sequence that fulfills the requirements of the business: balancing supply with demand, minimizing inventory investment, increasing service levels, and stabilizing material procurement (internal and external).

Master scheduling usually reviews the production plan, forecast, inventory levels, and inventory policy to prepare a master schedule. Because of the nature of configurable products it is not possible to create a forecast for production planning since the options of the configurable product are typically selected by the customer. It is possible to create special packages that are based off of the generic configurable product that can be treated as a stockable product. These special packages would typically be configurations that are ordered most frequently by the customer. By creating these stockable assemblies, production can be leveled when customer requirements are low and lead times can be reduced if the majority of the production time is spent producing the base assemblies. Consideration should be given to the structure of the stockable types for future re-configuration upon customer request.

Automobiles, computers, chemical products, bicycles, power tools, semiconductors, and drugs are some examples of products that are master scheduled. Master schedule items require close monitoring of production resources (work centers) and carry significant value in terms of inventory.

Once the master schedule is executed, MRP (Materials Requirements Planning) is run. MRP looks at the master schedule to see what will be produced and when, and then it looks at the current inventory levels for the materials utilized in production BOM. MRP then plans production and purchase orders for when they are required. If the MRP cannot meet the requirements of the MPS, the MPS has to be adjusted and MRP is run again.

Create Custom Production Order: The generic BOM, which contains all possible items for the final assembly, is entered into the product configurator. The sales order is entered and the various options are selected based on the allowable options that the customer wants. By building production orders using a product configurator, the correct items will be reflected on the BOM for production and the inventory will be adjusted properly at order completion. In addition to configuring BOMs, a product configurator should also support the concept of configurable routings. This concept follows closely with configurable BOMs and can be very useful in coordinating the assembly of configurable products.

Custom Build Product: Production produces the product, relieving the items that are reflected on the BOM from the inventory, and the product is delivered to the customer.

The BOM that is exploded for a specific production order is one in which specific items have been selected at sales order time from the generic BOM by considering the customers requirements in combination with the validation rules that have been built into the system regarding Engineering expertise.

Examples of product configuration are being utilized today. For instance, Levi Strauss uses an in-store personal computer to tailor a pair of jeans to the customer's measurements. The customer types their measurements into the computer, and the monitor informs the customer of which style would fit them best. The customer's measurements are used to give the jeans a customer fit. Tailored jeans are shipped back to the store or directly to the customer within three weeks and cost only $10 more than a mass-produced pair. When this system was adopted by a Cincinnati store, its sales of women's jeans increased 300% in one year.

Product configuration enables the sales, production and distribution of complex products that contain a high number of possible options. The ability of companies to customize, or configure, a product based on customer demands is a requirement in the highly competitive market of today.

The second sub-process is Define Production Processes 6030.10. This sub-process refers to determining the most appropriate manufacturing and planning strategies for a company. The strategies should support their customer needs through the most efficient means of producing the product while keeping in mind customer satisfaction, quality, and overall costs.

Environment/Characteristics: Client is often looking for quick fixes to complex problems. Manufacturing methods are often based on company tradition.

Challenges: Keeping pace with changing customer demand. Providing a final product that is priced competitive while maintaining quality. Resistance to change is often strong among the initial designers. Employee job security tends to decrease when strategy changes are considered.

The third sub-process is Optimize Production Processes 6030.15. The objective of this sub-process is to determine the most appropriate manufacturing and planning optimization strategies for a company. The strategies should support their customer needs through the most efficient means of producing the product while keeping in mind customer satisfaction, quality, and overall costs.

Environment/Characteristics: Client is often looking for quick fixes to complex problems. Manufacturing methods are often based on company tradition.

Challenges: Keeping pace with changing customer demand. Providing a final product that is priced competitive while maintaining quality. Resistance to change is often strong among the initial designers. Employee job security tends to decrease when strategy changes are considered.

The fourth sub-process is Manage Product Testing 6030.20. This sub-process is management of product testing. This testing may be accomplished in a variety of ways. It may be accomplished by customer groups, internal testing or governmental agencies. When developing an M&E product, testing is critical. This testing may be conducted with governmental oversight and require the organization to provide and track product testing guidelines and the performance measures.

The fifth sub-process is Manage Product and Service Changes 6030.25. This sub-process is management of the product and service. This includes the events which detail defined set up of samples, creation of samples and supporting sales information. Additionally, it includes the management of product grouping known as batches and management of these groups of products.

6040 Produce Products

The first sub-process is Leveling Loads 6040.05. Load leveling involves the modification of production plans based upon the constraints imposed by production capacities. After a replenishment plan is created the demands placed upon production resources must be considered to determine if those needs can be met by the manufacturer. When the current manufacturing processes and resources cannot meet the needs of the unconstrained production plan, load leveling attempts to take advantage of periods in which additional or leftover capacity exists to shift capacity so that some/all of the existing unmet needs may be satisfied by the plan. Additional shift of capacity to other resources in the same plant and to other resources in other plants are also possible solutions that can be applied automatically by the system to solve overload situations.

The second sub-process is Managing CPP Exceptions 6040.10. Managing Exceptions involves the modification of production plans based upon the constraints imposed by production capacities. After a the exception plan is created, the demands placed upon production resources must be considered to determine if those needs can be met. When the current manufacturing processes and resources cannot meet the needs of the exception production plan, load leveling attempts to take advantage of periods in which additional or leftover capacity exists to shift capacity so that some/all of the existing unmet needs may be satisfied by the plan. Additional shift of capacity to other resources in the same plant and to other resources in other plants are also possible solutions that can be applied automatically by the system to solve overload situations.

The third sub-process is Execute Discrete Production 6040.15. This sub-process has the objective to manufacture products efficiently through the use of similar processes, minimized shop floor controls, and reduced material management efforts in a discrete manufacturing environment.

Environment/Characteristics: (1) Production planning may not consider actual capacity compared to theoretical capacity. (2) Material may not be available if backorders exist from suppliers. (3) Work centers may break down causing bottlenecks in the production process. (4) Lead times may be inaccurate causing differences in projected production time to actual production time. (5) Capacities or scrap may be miscalculated resulting in inaccurate output data. (6) Material master files, bills of material, and routings must be defined accurately. (7) Production priorities are maintained and recalculated. (8) Input and output to the shop floor are controlled. (9) Management of production backlog.

Challenges: (1) A large amount of data is collected and must be entered on a timely basis. (2) Actual performance must be measured and variances recorded. (3) Production priorities can change rapidly. (4) Planned output is defined based on business planning, sales forecasting, market planning, and production planning, all of which can be difficult to coordinate. (5) Materials are issued to staging areas (WIP) which require replenishment.

The fourth sub-process is Execute Repetitive Production 6040.20. In preparation for repetitive manufacturing to occur, materials must be easily accessible to the production line. In repetitive manufacturing, materials are staged "anonymously" (i.e., without reference to a particular order) at Work In Progress (WIP) locations close to the production line. These WIP locations can either be supplied from a central warehouse or an outside supplier. Numerous methods exist for the replenishment of the WIP locations, the following methods may apply in any repetitive manufacturing environment.

The fifth sub-process is Manage Production Quality 6040.25. Quality Management can help manufacturing improve the quality of their products and, as a result, achieve an increase in overall customer satisfaction. Compliance with QM standards is an important factor in producing high-quality products. Such products promote long-lasting customer relationships, reduce expenses, and improve competitiveness. The ISO 9000 international quality standards, for example, specify that a QM system should be integrated with all processes in an enterprise.

The development of a thorough quality inspection plan is a good first step on the road to implementing quality in delivery. A quality inspection plan describes the inspection process for one or several materials in a plant.

6050 Acquire/Dispose Capability

The first sub-process is Determine Process Application to Other Products 6050.05. Once the manufacturing processes are established they may be utilized for other products. These events provide the foundation to apply current product production processes to other production venues or products.

The second sub-process is Establish Capital Budget Plan and Schedule Integrated with Process Support 6050.10. This sub-process includes understanding previous capital expenditures, as well as integrating capital budget requirements based on the organization's five-year strategic plan. This may include items such as expansion of facilities, business systems, and equipment acquisition.

Schedule integration with process support begins with inputting the new capital budget plan and then identification of planned process changes to support the strategic capital budget requirements. This may include maintenance agreements, supplier/vendor arrangements, etc.

7000 Plan and Manage the Enterprise

The first layer of the MRO framework includes a seventh business area, Plan and Manage the Enterprise 7000, also referred to as Enterprise Management. Under this business area, in the second layer, the framework includes six business processes: Manage Finances and Costs 7010, Manage Human Resources 7020, Manage Facilities 7030, Manage Information 7040, Manage External Relations 7050, and Manage Programs 7060. Each of these processes includes a number of sub-processes in the third layer of the framework.

7010 Manage Finances and Costs

The first sub-process is Manage Assets 7010.05. Traditionally, managing fixed assets has been a time intensive process that produces little value. By implementing an efficient asset management program it's possible to achieve significant cost and productivity advantages. With good asset management, depreciation rules, costs, and budgets can be effectively controlled and maintained.

The following sub-processes are typical accounting functions of most organizations. The second sub-process is Perform Cash Management 7010.10. The third sub-process is Pay Taxes 7010.15. The fourth sub-process is Close Financial Period 7010.20. The fifth sub-process is Manage Activity Based Costing 7010.25.

The sixth sub-process is Manage Product Costing 7010.30. This specific business sub-process is most intended for organizations that plan to develop and sell a specific service and or product line. It is best suited for maintenance and engineering organizations, which currently have or are planning to deploy an outsourcing capability.

7020 Manage Human Resources

The first sub-process is Administer Workforce Planning 7020.02. This sub-process includes the objective of managing internal promotions and mobility within the organization while enhancing each employee's capacity to handle responsibilities and authority. The sub-process also includes the objective to accurately determine and schedule the appropriate type and number of human resources required for the organization to carry out business requirements.

The second sub-process is Manage Organization Infrastructure 7020.05. This sub-process has the objectives to (1) facilitate accurate organizational planning and forecasting; (2) enable efficient and accurate processing of other key Human Resource tasks such as payroll, time management, and benefits administration; and (3) to achieve position administration as it relates to the defined organizational structure.

The third sub-process is Manage Employee Information 7020.10. When an employee is hired into an organization crucial personal details (e.g., SSN, bank account details, address, family members, etc.) must be both captured and maintained.

The fourth sub-process is Evaluate and Develop Employees 7020.15. Employee development and evaluation pertains to the integration of employee training programs, and the tracking of employee performance and competencies.

The fifth sub-process is Manage Recruiting 7020.20. Manage Recruiting is concerned with the activities related to the human resources recruiting sub-process. It starts with planning for a need, communicating the need, screening candidates, and selecting the candidate.

The sixth sub-process is Manage Travel 7020.25. Manage Travel is concerned with the activities related to the business related travels of employees.

The seventh sub-process is Schedule Employees and Manage Time 7020.30. This sub-process is concerned with scheduling and recording the work schedules of employees to maximize employee productivity and capturing useful data for improving employee attendance and moral.

The eighth sub-process is Manage Benefits and Compensation 7020.35. Benefits administration pertains to the management of employee benefits (i.e., health plans, insurance plans, savings plans, flexible spending accounts and flex credit accounts).

The ninth sub process is Administer Payroll 7020.40. Payroll processing includes generating accurate and timely payroll disbursements that can be distributed both efficiently and cost effectively.

The tenth sub-process is Administer Compensation 7020.45. Compensation management includes administering and maintaining a monetary and nonmonetary rewards/incentives program.

The eleventh sub-process is Manage Environment, Safety and Health 7020.50. This sub-process relates to complying with government work safety rules and reporting requirements. The objective is to provide a safe environment to minimize lost productivity due to employee injuries and administrative time spent on compliance activities associated with injuries.

7030 Manage Facilities

The first sub-process is Manage Equipment Master Data 7030.05. This sub-process has the objective to create and maintain master data for maintenance of machinery, material, and resources for planning and executing periodic or usage maintenance necessary to operate facilities with a minimum of unscheduled downtime.

Environment/Characteristics: (1) Assets or resources used in the manufacturing process that experience wear or degradation of performance over time, must be identified. (2) Other non-production assets or equipment that require maintenance need to be identified. (3) Manufacturers warranty, service manuals, bill of materials, parts list, assemblies, and service intervals etc., ideally are available for entry into this master data. (4) Commitment to plant maintenance strategy must be obtained. (5) Resources (internal or external), required to perform the work must be identified. (6) Need to identify which records needs to be kept for legal purposes.

The second sub-process is Perform Plant Maintenance 7030.10. |This sub-process includes both preparing for, performing and recording the maintenance activities of the plant and/or fleet assets. This sub-process focuses on the business aspects of supporting the maintenance activities described in detail above. A problem with maintenance, as it is practiced in industry, is that most companies do not adequately merge the business plan with the maintenance plan.

The third sub-process is Plan Plant Maintenance 7030.15. The objective of planning plant maintenance is to ensure the long-term and continued availability of production and reduce unnecessary costs that arise from repairs, system replacement, and production loss.

7040 Manage Information

The first sub-process is Manage Information Systems 7040.05. The Archiving sub-process provides for the development of a set of events to complete to ensure that proper archiving of specific information is both conducted and maintained. This should be conducted on a regular basis to ensure compliance with business continuance policies.

The second sub-process is Manage Information Exchange 7040.10. This sub-process details the activities required for the management and exchange of information which will assist leadership with the management and decision making for the business. This information exchange is largely a data warehouse which is populated with information such as customers, ordering information, purchasing, etc.

The third sub-process is Manage Knowledge Capital 7040.15. This sub-process is the management of the organizations knowledge capital. Functional departments and organizations will develop various process, information and knowledge, which may or may not be licensable processes or technologies. These objects are very valuable to the organization and to prevent the loss of information due over the course of time it is critical that a solid process be developed to capture and maintain the organizations knowledge base.

7050 Manage External Relations

The first sub-process is Manage Relations with Investors 7050.05. The activities included within this sub-process are focused on various public notifications required, annual meeting content and distribution of annual reports.

The second sub-process is Communicate Government Compliance 7050.10. Companies have a vested interest in complying with all government regulations as they relate to employees, processes, or capital equipment utilized to perform their basic business tasks (i.e. aircraft; power plants; etc).

The third sub-process is Manage Public Relations 7050.15. Managing public relations includes all tasks and events relating to communication and marketing of the organization to outside individuals, groups and or organizations.

The fourth process is Manage Labor Relations 7050.20. Managing labor relations is the sub-process of collective bargaining with particular groups of people within an organization. This may include union negotiations, contract disputes or any negotiation with a group of individuals represented by an external entity.

7060 Manage Programs

The sub-processes included within this activity deal with the establishment of program structures (performance criteria; schedules; budgets; accomplishment milestones) and the company-customized manner within which programs interact with organization structures and other required business function. This area is so diverse that individual sub-processes have not been defined, but the requirement for program management is denoted as of significant importance to any MRO.

8000 Strategic Management

The first layer of the MRO framework includes an eighth business area, Strategic Management 8000. Under this business area, in the second layer, the framework includes three business processes: Develop Goals and Objectives 8010, Maintain Strategic Plans 8020, and Manage Logistics Network 8030. Each of these processes includes a number of sub-processes in the third layer of the framework.

8010 Develop Goals and Objectives

The first sub-process is Set Corporate Missions/Goal 8010.05. This sub-process describes the requirements to develop and set the corporate missions and goals. While the corporate mission are longer term in timeframes and rarely change, most executive teams will review the mission to ensure that it fits with the longer-term corporate strategy.

The second sub-process is Determine Key performance Indicators (KPI's) 8010.10. This sub-process describes the requirements to link the KPI's to controllable events and leverage the KPI's to front line personnel. In order for KPI's to be useful to both measure and manage the business unit, the KPI's must be easily and directly linked to business process results or events. Additionally, KPI's are then leveraged to everyone in the organization to ensure that each task performed by individuals and work performed by teams has a direct impact and link to the measurable performance of the unit.

The third sub-process is Set Budgets/Schedules/Quality Measure in Accordance with KPI Recommendation 8010.15. This sub-process describes the requirements to establish Key Performance Indicators, which measure the performance of the business or business unit. KPI's should be created which measure across performance areas without limiting measurement to financial performance.

8020 Maintain Strategic Plans

The first sub-process is Plan Capacity 8020.05. This sub-process describes the requirements to develop Capacity Planning requirements. It includes looking at information for current needs, comparing past forecasts with current capacity requirements and forecasting future capacity requirements.

The second sub-process is Develop Business Plan 8020.10. This sub-process concerns the requirements to develop Annual Budget/Costs.

The third sub-process is Establish Corporate Policy and Standards 8020.15. This sub-process concerns the requirements to establish and develop strategic plans from both financial and operational perspectives.

The fourth sub-process is Design and Implement Pricing Strategy 8020.20. This sub-process includes gathering information and developing policies and procedures for establishing pricing and promotions.

8030 Manage Logistics Network

The first sub-process is Develop Logistics Strategy 8030.05. Developing logistics strategy begins with an understanding of how the components of a logistics system work in harmony to create buyer value for the customer and strategic value for the company. There are ten key components of a logistics strategy, organized on four key levels, which must be fully coordinated and integrated to achieve world-class logistics performance. They are:
1. Implementation level: (a) Information Systems; (b) Policies and Procedures; (c) Facilities and Equipment; and (d) Organization and Change Management. 2. Functional level: (a) Warehouse Design and Operations; (b) Transportation Management; and (c) Materials Management. 3. Structural level: (a) Channel Design; and (b) Network Strategy. 4. Strategic level: (a) Customer Service. Source: Robeson & Copacino, eds., *The Logistics Handbook*, New York, The Free Press, 1994.

The second sub-process is Develop Resource Plan 8030.10. The term resource refers to all production, maintenance, transport, storage, waste disposal or recycling facilities, as well as the persons working within them. Within strategic management, developing a resource plan (i.e., short-term, mid-range, and long term planning) for the business involves the critical analysis of relevant information (e.g., supply and demand, market trends, etc.) to ensure that a strategic plan is in place to cope with fluctuations inherent in the business, such that all resources required to fulfill demand will be available.

The third sub-process is Manage Transportation Network 8030.15. Transportation is a central element in the logistics chain. The development of efficient and cost-effective transportation strategies is essential to ensure a high level of customer service while minimizing operating costs. This solution provides a high level overview of the steps necessary to take advantage of the transportation functionality.

9000 Generate Demand

The first layer of the MRO framework includes a ninth business area, Generate Demand 9000, also referred to as Demand Generation. Under this business area, in the second layer, the framework includes five business processes: Obtain Product Configuration 9010, Market Forecasts 9020, Create Proposals 9030, Contract Management 9040, and Manage Customer Agreements 9050. Each of these processes includes a number of sub-processes in the third layer of the framework.

9010 Obtain Product Configuration

The first sub-process is Determine Fleet Content (By Family and Block) 9010.05. In advance of arrival of new equipment the aircraft operator and or the Original Equipment Manufacturer must identify the fleet type (fleet family), fleet generation type (aircraft model) and fleet generation sub type of aircraft by tail number.

The second sub-process is Determine Configurations 9010.10. From the obtained configuration documents the as-designed configurations are determined and any unique configurations are identified. From the as-designed data logical maintenance builds are designed. A logical maintenance build (as the equipment should be configured) will be used in the future to assure that maintenance tasks result in an approved configuration. Part alternates are identified and input into the parts catalog and the ability to revise and update this information is established.

The third sub-process is Manage Change 9010.15. Orders for engineering changes need to be considered before and during the maintenance cycle so that preparations can be made to integrate these changes into existing maintenance plans as well as for identification of possible "unplanned" work. These orders for engineering changes, also know as T.O.'s (Technical Orders), are archived before arrival of equipment and need to maintained and updated when appropriate. Once these change orders have been archived, references to the actual engineering change documents are made. The engineering change documents differ from the orders in that they describe, at a low level of detail, what changes need to be made from an engineering perspective where the orders for these changes are announcements that a change is needed or pending. These engineering change documents are then referenced to all open or pending work orders so that they may be integrated into the work schedule. After the scheduling changes are made the work plan is updated and the approved configuration of the equipment is updated to reflect the changes that have/will be made.

The fourth sub-process is Obtain Spares Requirement Information 9010.20. In this sub-process, information is gathered regarding current and future spares requirements.

The fifth sub-process is Plan Spares Requirements 9010.25. In this sub-process, current and future spares requirements are planned for in terms of content, quantity, and warehouse locations. Preferably, temporal consideration is provided for just-in-time delivery of spares coordinated with predicted maintenance schedules.

9020 Market Forecasts

The first sub-process is Develop and Execute Marketing Plan 9020.05. The second sub-process is Perform Sales and Operations Planning 9020.10. The third sub-process is Forecast Customer Demand 9020.15. These sub-processes These sub-processes provide workflow requirements for business and sales forecasting as are well known in the art.

9030 Create Proposals

The first sub-process is Determine Strategic Capacity for Market 9030.05. This sub-process deals with the determination by the MRO business of the kinds and types of maintenance, repair, and overhaul work which the business will target and "propose" on to potential customers, as well as the determination of that work which will not be sought by the business.

The second sub-process is Establish Essential Technical Issues and Calendars for Customers and Providers (Proposal Technical Terms) 9030.10. The activities contained within this sub-process deal with investigating the technical issues which exist and/or are forecasted to exist for the potential customers (i.e., Is the demand for heavy maintenance increasing or decreasing, and why?), and how do those customer needs match with the MRO providers' plans and forecasts.

The third sub-process is Prepare Bill of Work 9030.15. This sub-process deals with the detailing of the tasks which were proposed to, and accepted by, the customer to be performed on his end items.

The fourth sub-process is Pricing of Proposals to Customer 9030.20. This sub-process utilizes the details created by the Bill of Work, and applies company pricing rules to those tasks to establish the work package baseline cost to the customer.

9040 Contract Management

In Contract Management process 9040, the sub-process is Plan Maintenance Schedule 9040.05. Planning maintenance follows completion of the maintenance schedule. Planning is the process of determining the dates and resources needed to perform critical maintenance activities. Once planning is complete maintenance scheduling and execution may begin.

9050 Manage Customer Agreements

The first sub-process is Manage Customer Satisfaction 9050.05. The second sub-process is Manage and Evaluate Account 9050.10. The third sub-process is Manage Customer Data 9050.15. These three sub-processes all deal with the close tracking of customer issues, and the response to those issues to the satisfaction of the customer. By managing customer data effectively, the MRO operator increases the probability of repeat business and cost effective contract negotiation in the future.

The fourth sub-process is Manage Customer Agreements 9050.20. This sub-process deals with the detailed tracking of each line item established by the bill of work, reporting the status of those details to the customer representatives assigned, and assuring that the customer responds to the status as contractually specified.

The fifth sub-process is Perform Credit Management 9050.25. The activities contained within this sub-process deal with the creation of proper customer credit records, and the performance of credit checks, and associated financial stability investigations. This can be a critical task for major item MRO providers as any single customer credit failure can jeopardize the entire MRO business.

The sixth sub-process is Perform Collections 9050.30. The activities contained within this sub-process deal with the timely and complete collection of moneys owed to the MRO business by customers and/or vendors (in the case of the return of unacceptable components to those vendors, or collection against warranty reimbursements.)

While this invention has been shown and described in connection with a preferred embodiment, it is apparent that certain changes and modifications in addition to those mentioned above may be made from the basic features of this invention. In addition, there may be many different types of computer software and hardware that may be utilized for practicing the invention, and the invention is not limited to the examples described above. Accordingly, the described embodiments are to be considered in all respects only as illustrative and not restrictive, and the scope of the invention is therefore indicated by the appended claims rather than the foregoing description. All changes that come within the scope and range of the equivalency of the claims are to be embraced within their scope.

What is claimed is:

1. A method comprising:
   encoding a model hierarchical framework for maintenance, repair and overhaul (MRO) business management in a computer readable medium, the model hierarchical framework comprising:
      a first layer identifying business areas in a model MRO business, the first layer comprising first links to a second layer identifying a model process within at least one of the business areas, the second layer comprising second links to a third layer identifying a model sub-process within at least one of the processes;
   mapping software tools to the business areas, including each process and sub-process;
   accessing the computer readable medium and comparing a specified MRO business to the model hierarchical framework;
   determining a specific sub-process of the specified MRO business corresponding to the model sub-process in the model hierarchical framework; and
   identifying a sub-process software tool from the software tools mapped to the model sub-process.

2. The method of claim 1, further comprising:
   determining a specific process of the specified MRO process corresponding to the model process in the model hierarchical framework;
   identifying a process software tool from the software tools mapped to the model process; and
   selecting the process software tool for application to the specific process of the specified MRO business.

3. The method of claim 1, wherein said business areas comprise a flight operations management business area, a maintenance execution business area, a maintenance management business area, an engineering and maintenance support business area, a material management business area, a product development business area, an enterprise management business area, a strategic management business area, and a demand generation business area.

4. A method for managing IT support for a maintenance, repair and overhaul (MRO) business, the method comprising:
   encoding a model hierarchical framework for MRO business management in a computer readable medium, the model hierarchical framework comprising:
      a first layer identifying business areas in a model MRO business, the first layer comprising first links to a second layer identifying a model process within at least one of the business areas, the second layer comprising second links to a third layer identifying a model sub-process within at least one of the processes;
   accessing a mapping of model software tools to the model MRO business processes and sub-process to compare specific software tools for a specified MRO business against the model software tools; and
   customizing at least one of the specific software tools based on the comparison to fit the specified MRO business to the model MRO business.

5. The method of claim 1, further comprising performing a benchmark analysis of the specified MRO business against the model MRO business.

6. The method of claim 5, where the model MRO business comprises an industry best-practices model MRO business.

7. The method of claim 1, further comprising performing a gap analysis of the specified MRO business against the model MRO business.

8. The method of claim 7, where performing the gap analysis comprises determining a lacking process absent from the specified MRO business based on a comparison of the specified MRO business to the model MRO business.

9. The method of claim 7, where performing the gap analysis comprises determining an improvable process in the specified MRO business based on a comparison of the specified MRO business to the model MRO business.

10. The method of claim 1, where the specified MRO business comprises a pre-implementation MRO business.

11. The method of claim 4, where the model MRO business comprises an industry best-practices model MRO business.

12. The method of claim 4, where the specified MRO business comprises a pre-implementation MRO business.

* * * * *